US012583104B2

(12) United States Patent　　　　　(10) Patent No.: US 12,583,104 B2
Fuhlbrigge et al.　　　　　　　　　　(45) Date of Patent: Mar. 24, 2026

(54) SYSTEM AND METHOD FOR TEACHING A ROBOT PROGRAM

(71) Applicant: SCALABLE ROBOTICS INC., Ellington, CT (US)

(72) Inventors: Thomas Andrew Fuhlbrigge, Ellington, CT (US); Carlos Martinez, South Windsor, CT (US); Gregory Rossano, Enfield, CT (US)

(73) Assignee: SCALABLE ROBOTICS INC., Ellington, CT (US)

( * ) Notice: Subject to any disclaimer, the term of this patent is extended or adjusted under 35 U.S.C. 154(b) by 70 days.

(21) Appl. No.: 18/690,023

(22) PCT Filed: Sep. 7, 2022

(86) PCT No.: PCT/US2022/042715
§ 371 (c)(1),
(2) Date: Mar. 7, 2024

(87) PCT Pub. No.: WO2023/038942
PCT Pub. Date: Mar. 16, 2023

(65) Prior Publication Data
US 2025/0128410 A1　　Apr. 24, 2025

Related U.S. Application Data

(60) Provisional application No. 63/260,941, filed on Sep. 7, 2021.

(51) Int. Cl.
*B25J 9/16*　　　　　(2006.01)
(52) U.S. Cl.
CPC .................................... *B25J 9/163* (2013.01)

(58) Field of Classification Search
CPC ........ B25J 9/163; B25J 9/0081; B25J 9/1656; G05B 2219/36401; G05B 2219/36453;
(Continued)

(56) References Cited

U.S. PATENT DOCUMENTS 2,019,024 A　　10/1935　Emerson
5,662,566 A　　9/1997　Marxrieser
(Continued)

FOREIGN PATENT DOCUMENTS

CN　　　102009323 B　　1/2013
DE　　102016120132 A1　　4/2018
(Continued)

OTHER PUBLICATIONS

Ng et al "Intuitive Robot Tool Path Teaching Using Laser and Camera in Augmented Reality Environment", 2010 11th Int. Conf. Control, Automation, Robotics and Vision (Year: 2010).*
(Continued)

*Primary Examiner* — Esvinder Singh
(74) *Attorney, Agent, or Firm* — Dilworth IP, LLC

(57) ABSTRACT

A system and method for teaching a robot program based on user input. In some embodiments, poses of a posing device manipulated by a user are captured and analyzed. In some embodiments, robot instructions are determined by a machine-learning algorithm that is trained on data concerning previously executed instructions evaluated by a user. In some embodiments, a user-selected process type defines workpiece geometry types for guiding the creation of robot instructions. In some embodiments, an augmented- or virtual-reality user interface is provided for obtaining user input.

12 Claims, 20 Drawing Sheets

(58) Field of Classification Search

CPC ........... G05B 2219/36482; G05B 2219/36496;
G05B 2219/37194; G05B 2219/37555;
G05B 2219/39435; G05B 2219/39449;
G05B 2219/39451; G05B 2219/40398;
G09B 19/24; G06F 3/011; G06F 3/017;
G06F 3/0346; G06N 3/006; G06N 20/00

See application file for complete search history.

(56) References Cited

U.S. PATENT DOCUMENTS

| | | |
|---|---|---|
| 6,308,144 B1 | 10/2001 | Bronfeld et al. |
| 6,421,048 B1 | 7/2002 | Shih |
| 6,542,925 B2 | 4/2003 | Brown |
| 6,724,364 B2 | 4/2004 | Tani |
| 7,069,108 B2 | 6/2006 | Saarela |
| 7,236,854 B2 | 6/2007 | Pretlove |
| 7,353,082 B2 | 4/2008 | Pretlove |
| 7,856,285 B2 | 12/2010 | Carbonera |
| 8,032,605 B2 | 10/2011 | Brown |
| 8,050,782 B2 | 11/2011 | Faellman |
| 8,660,300 B2 | 2/2014 | Svajda |
| 8,751,049 B2 | 6/2014 | Linder |
| 8,918,208 B1 | 12/2014 | Hickman |
| 9,102,055 B1 | 8/2015 | Konolige |
| 9,128,530 B2 | 9/2015 | Yin |
| 9,188,437 B2 | 11/2015 | Kurahashi |
| 9,333,649 B1 | 5/2016 | Bradski |
| 9,423,879 B2 | 8/2016 | Chen |
| 9,669,544 B2 | 6/2017 | Buehler |
| 9,671,777 B1 | 6/2017 | Aichele |
| 9,737,371 B2 | 8/2017 | Romo |
| 9,772,394 B2 | 9/2017 | Nagalla |
| 9,811,074 B1 | 11/2017 | Aichele |
| 9,818,231 B2 | 11/2017 | Coffey |
| 9,895,841 B2 | 2/2018 | Page |
| 9,919,421 B2 | 3/2018 | Rossano |
| 10,078,325 B2 | 9/2018 | Gunnarsson |
| 10,162,329 B2 | 12/2018 | Ndip-Agbor |
| 10,228,428 B2 | 3/2019 | Gustafsson |
| 10,383,654 B2 | 8/2019 | Yilmaz |
| 10,406,686 B2 | 9/2019 | Boca |
| 10,427,300 B2 | 10/2019 | Boca |
| 10,448,692 B2 | 10/2019 | Hsu |
| 10,737,396 B2 | 8/2020 | Rossano |
| 10,864,633 B2 | 12/2020 | Chipalkatty |
| 10,956,739 B2 | 3/2021 | Thomasson |
| 11,059,076 B2 | 7/2021 | Bauer |
| 2001/0028339 A1 | 10/2001 | Tani |
| 2004/0111178 A1 | 6/2004 | Saarela |
| 2005/0149231 A1 | 7/2005 | Pretlove |
| 2005/0256611 A1 | 11/2005 | Pretlove |
| 2008/0065243 A1 | 3/2008 | Fallman |
| 2008/0177410 A1 | 7/2008 | Carbonera |
| 2009/0132088 A1 | 5/2009 | Taitler |
| 2010/0150399 A1 | 6/2010 | Svajda |
| 2010/0185328 A1 | 7/2010 | Kim |
| 2010/0303337 A1 | 12/2010 | Wallack |
| 2011/0288964 A1 | 11/2011 | Linder |
| 2013/0222580 A1 | 8/2013 | Kurahashi |
| 2013/0249784 A1 | 9/2013 | Gustafson |
| 2013/0346348 A1 | 12/2013 | Buehler et al. |
| 2015/0002391 A1 | 1/2015 | Chen |
| 2015/0049081 A1 | 2/2015 | Coffey |
| 2015/0177846 A1 | 6/2015 | Yin |
| 2015/0290802 A1 | 10/2015 | Buehler |
| 2015/0309316 A1 | 10/2015 | Osterhout |
| 2015/0314442 A1 | 11/2015 | Boca |
| 2015/0321427 A1 | 11/2015 | Gunnarsson |
| 2015/0324490 A1 | 11/2015 | Page |
| 2016/0016363 A1 | 1/2016 | Smith |
| 2016/0143693 A1 | 5/2016 | Yilmaz |
| 2016/0167232 A1 | 6/2016 | Takeshita |
| 2016/0184032 A1 | 6/2016 | Romo |
| 2016/0257000 A1 | 9/2016 | Guerin |
| 2016/0260261 A1 | 9/2016 | Hsu |
| 2016/0303737 A1 | 10/2016 | Rossano |
| 2016/0375524 A1 | 12/2016 | Hsu |
| 2017/0028557 A1 | 2/2017 | Battisti |
| 2017/0130648 A1 | 5/2017 | Jochman |
| 2017/0143442 A1 | 5/2017 | Tesar |
| 2018/0092698 A1 | 4/2018 | Chopra |
| 2018/0154518 A1 | 6/2018 | Rossano |
| 2018/0173200 A1 | 6/2018 | Atherton |
| 2018/0250822 A1 | 9/2018 | Shimodaira et al. |
| 2018/0286119 A1 | 10/2018 | Felip Leon |
| 2018/0311818 A1 | 11/2018 | Chipalkatty |
| 2018/0345495 A1 | 12/2018 | Aldridge |
| 2018/0350056 A1 | 12/2018 | Cardenas Bernal |
| 2019/0184582 A1 | 6/2019 | Namiki |
| 2019/0275744 A1 | 9/2019 | Tsoutsos |
| 2019/0291277 A1 | 9/2019 | Oleynik |
| 2020/0167886 A1 | 5/2020 | Cho |
| 2020/0250490 A1 | 8/2020 | Ozawa |
| 2020/0251363 A1 | 8/2020 | Yoshida |
| 2020/0306980 A1 | 10/2020 | Choi |
| 2020/0368904 A1* | 11/2020 | Aldridge .............. B23K 9/0953 |
| 2021/0063998 A1* | 3/2021 | Liu .................... G05B 19/4097 |
| 2021/0129339 A1 | 5/2021 | Pipe-Mazo |
| 2021/0138646 A1* | 5/2021 | Matsushima .......... B25J 9/1684 |
| 2021/0220991 A1 | 7/2021 | Rajkumar |
| 2021/0316449 A1 | 10/2021 | Wang |
| 2022/0152833 A1 | 5/2022 | Lee |
| 2023/0043994 A1 | 2/2023 | Takahashi |

FOREIGN PATENT DOCUMENTS

| | | |
|---|---|---|
| EP | 1435280 A2 | 7/2004 |
| WO | 2018005053 A1 | 1/2018 |

OTHER PUBLICATIONS

Extented European Search Report and Search Opinion received for EP Application No. 22867979.1, mailed on Jul. 14, 2025, 18 pages.

International Search Report and Written Opinion issued in App. No. PCT/US22/42715, mailing date Feb. 27, 2023, 51 pages.

Hsien-Chung Lin, "Embedding intelligence into Robotic Systems-Programming, Learning, and Planning", University of California, Berkeley, Graduate Division, Engineering—Mechanical Engineering, Doctoral Thesis, (online), Nov. 3, 2018 [retrieved on Dec. 16, 2022] retrieved from the Internet <https://escholarship.org/content/qt5z62k45g/qt5z62k45g.pdf> 91 pages.

* cited by examiner

16

101

110

120

130

15

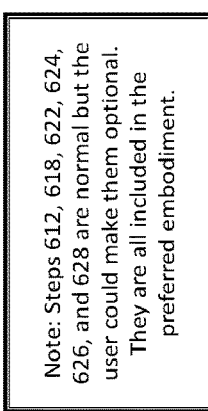

Note: Steps 612, 618, 622, 624, 626, and 628 are normal but the user could make them optional. They are all included in the preferred embodiment.

Fig. 6A

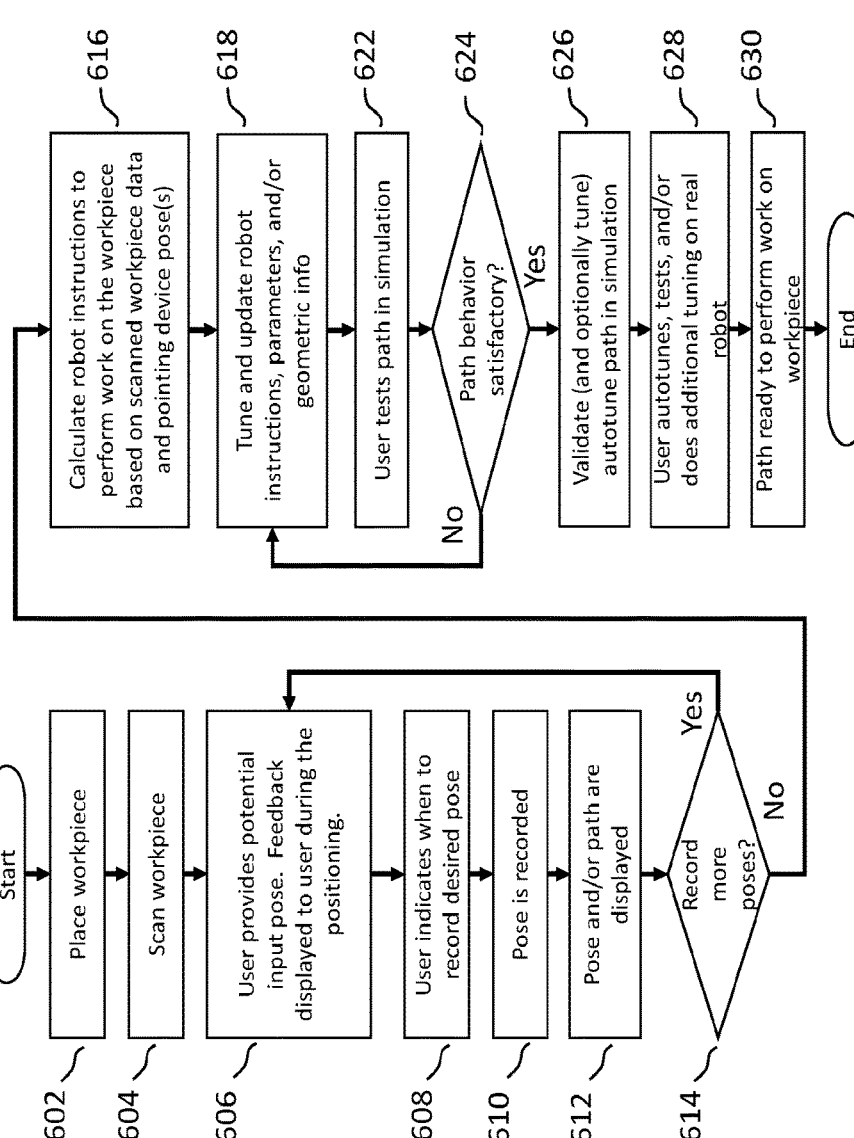

600

Start

Place workpiece — 602

Scan workpiece — 604

User provides potential input pose. Feedback displayed to user during the positioning. — 606

User indicates when to record desired pose — 608

Pose is recorded — 610

Pose and/or path are displayed — 612

Record more poses? — 614
Yes / No

Calculate robot instructions to perform work on the workpiece based on scanned workpiece data and pointing device pose(s) — 616

Tune and update robot instructions, parameters, and/or geometric info — 618

User tests path in simulation — 622

Path behavior satisfactory? — 624
No / Yes

Validate (and optionally tune) autotune path in simulation — 626

User autotunes, tests, and/or does additional tuning on real robot — 628

Path ready to perform work on workpiece — 630

End

91

92

101

110

120

910

Additional
Scanning
Device

Pointing
Device

16

17 User

160

150 Virtual
Workpiece

Virtual
Robot

180

170 ⎦ Additional
Computing
Device

SYSTEM AND METHOD FOR TEACHING A ROBOT PROGRAM

FIELD

The present invention relates to a system and method for teaching a robot program. More particularly, this invention relates to a system and method for creating a variety of robot programs via human input, 3D scans, and/or mixed reality.

BACKGROUND

The programming of industrial robotics is a widely known challenge. This is because robot programming requires a rare combination of skills and knowledge, including industrial processes (e.g., welding, material removal, painting), programming (e.g., variables, control flow), and robotics (e.g., speeds, joint limits, singularities). What is required is a system and method that provides ease of use, highly accurate robot-motion commands, and a consistent user experience.

SUMMARY

The disclosed embodiments comprise a means for programming a robot that uses 3D scanning and end-user interaction. These interactions include using mixed reality, such as projecting teaching data in the robot workspace, and/or using other means of augmented reality. Several embodiments streamline the teaching process through machine learning and auto tuning. Other embodiments include the devices, methods, hardware and software components, and combinations thereof to create and execute a robot program. The terms "robot program" and "robot instructions" can be considered interchangeable in the description herein. A robot program is a collection of one or more robot instructions, and a set of one or more robot instructions can be executed as a robot program. Further embodiments, aspects, and details are provided in the figures and detailed description of the invention.

In some embodiments, the robot teaching system includes a robot having a jointed arm and an end effector, a 2D or 3D scanner, a user interface, and a non-transitory computer-readable medium having computer instructions for causing a computing environment to perform a method for teaching a robot program. In other embodiments the robot teaching system further includes a posing device, such as a process-agnostic pointing device, a dummy end effector, the end effector of the robot, or a hand of a user. In other embodiments, the robot teaching system further includes an augmented- or virtual-reality (AR/VR) user interface.

In some embodiments, the method for teaching the robot program may include the steps of:

obtaining geometric information about a workpiece via the scanner scanning the workpiece;

obtaining at least one pose, of the posing device, for the robot;

obtaining, via the user interface, program information describing at least one of a motion for the robot and a behavior for the end effector, and associating the at least one of the motion and the behavior with the at least one pose;

obtaining, via the user interface, a type of geometric relationship;

evaluating the type of geometric relationship between the geometric information and the at least one pose and displaying a representation of the geometric relationship during the obtaining of the at least one pose; and determining an original set of instructions of the robot program based on the geometric information, the program information, and the at least one pose, wherein the original set of instructions comprises at least one of a pose for the robot, a motion for the robot, and a behavior for the end effector.

In some embodiments, the method for teaching the robot program may include the steps of:

obtaining prior geometric information about at least one prior workpiece operated on by a prior robot;

obtaining current geometric information about a current workpiece, via the scanner scanning the current workpiece, to be operated on by a current robot;

determining at least one geometric association between at least a portion of the prior geometric information and at least a portion of the current geometric information;

obtaining, via the user interface, program information describing at least one of a motion for the current robot and a behavior for the end effector and determining at least one program-information association by associating the at least one of the motion and the behavior with portions of at least one of the prior geometric information and the current geometric information;

obtaining prior assessment information describing at least one of:

an indication of whether a prior instruction previously executed by the prior robot succeeded or failed, and a quality of an outcome of the prior instruction previously executed by the prior robot;

recommending to a user at least one current set of instructions for execution by the current robot for the current workpiece, wherein the recommendation is generated by a machine-learning algorithm having received as input the current geometric information, the program information, the at least one geometric association, the at least one program-information association, and the prior assessment information, wherein the at least one current set of instructions comprises at least one of a pose for the current robot, a motion for the current robot, and a behavior for the end effector.

In some embodiments, the method for teaching the robot program may include the steps of:

obtaining first geometric information about a workpiece via the scanner scanning the workpiece;

obtaining at least one pose, of the posing device, for the robot;

obtaining, via the user interface, program information describing at least one of a motion for the robot and a behavior for the end effector, and associating the at least one of the motion and the behavior with the at least one pose;

obtaining, via the user interface, a process type defining one or more first geometry types;

determining a first set of instructions of the robot program, based on the program information, the process type, the at least one pose, and at least a portion of the first geometric information comprising geometric components of the first geometry types, wherein the first set of instructions comprises a motion of the robot to obtain additional geometric information about the workpiece;

executing the first set of instructions by the robot to gather the additional geometric information;

updating the first geometric information based on the additional geometric information to create second geometric information;

determining a second set of instructions of the robot program based on the second geometric information, the program information, and the at least one pose, wherein the second set of instructions comprises at least one of a pose for the robot, a motion for the robot, and a behavior for the end effector.

In some embodiments, the method for teaching the robot program may include the steps of:

defining a scan volume containing a workpiece;

obtaining a detailed scan of the workpiece by scanning within the scan volume via the scanner;

obtaining at least one pose, of the posing device, for the robot;

obtaining, via the user interface, program information describing at least one of a motion for the robot and a behavior for the end effector, and associating the at least one of the motion and the behavior with the at least one pose; and determining a set of instructions of the robot program, based on the detailed scan, the at least one pose, and the program information, wherein the set of instructions comprises at least one of a pose for the robot, a motion for the robot, and a behavior for the end effector.

In some embodiments, the method for teaching the robot program may include the steps of:

obtaining a 3D model of a workpiece from geometric information determined from a scan of the workpiece via the scanner;

obtaining at least one pose, of the posing device, for the robot, at least partly via the AR/VR user interface;

obtaining, via at least one of the first user interface and the AR/VR user interface, program information describing at least one of a motion for the robot and a behavior for the end effector, and associating the at least one of the motion and the behavior with the at least one pose; and obtaining, via at least one of the first user interface and the AR/VR user interface, a type of geometric relationship;

evaluating the type of geometric relationship between the 3D model and the at least one pose and displaying a representation of the geometric relationship, via the AR/VR user interface, during the obtaining of the at least one pose; and determining an original set of instructions of the robot program, based on the 3D model, the at least one pose, and the program information, wherein the original set of instructions comprises at least one of a pose for the robot, a motion for the robot, and a behavior for the end effector.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings.

FIGS. 6A-6C shows a flowchart illustrating one example of a method of scanning a workpiece and using the pointing device to record poses used for creating instructions for the robot to perform work on a workpiece, and an optional tuning operation is also shown.

DETAILED DESCRIPTION

The present disclosure may be more readily understood by reference to the following detailed description and the accompanying drawings, which form a part of this disclosure. This disclosure is not limited to the specific devices, methods, conditions, or parameters described and/or shown herein, and the terminology used herein is for the purpose of describing particular embodiments by way of example only and is not intended to be limiting of disclosed embodiments or inventions. For example, "left," "right," "clockwise," and "counterclockwise" may be used as specific examples of generally opposite lateral or rotational directions, respectively. Also, as used in the specification and including the appended claims, the singular forms "a," "an," and "the" include the plural, and reference to a particular numerical value includes at least that particular value, unless the context clearly dictates otherwise.

The following numerals are used to describe various features of some of the embodiments.

Figure 1:
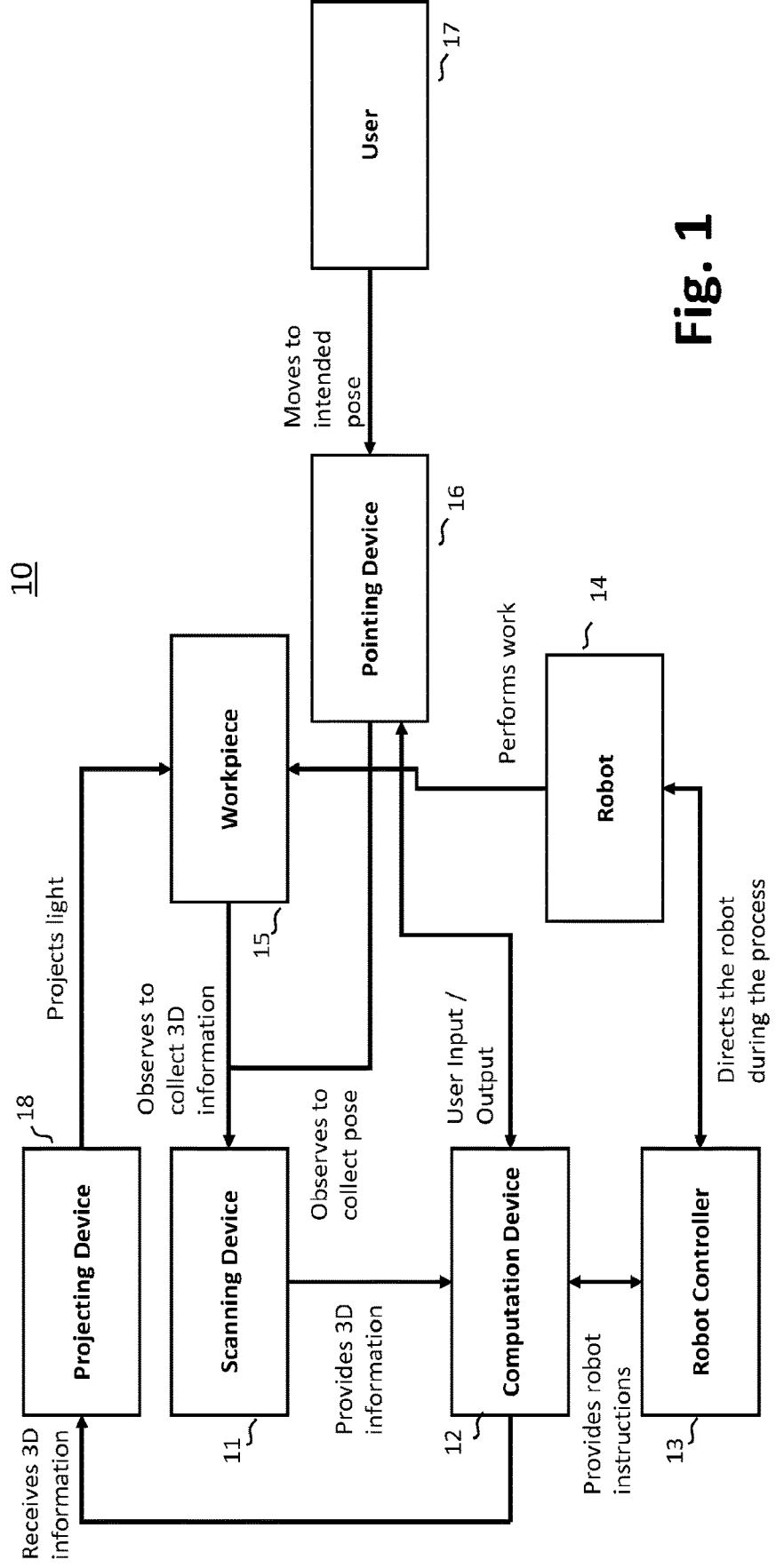
FIG. 1 is a block diagram for a robot system that is used to perform work on a workpiece according to an embodiment described in the present disclosure.
Figure 2:
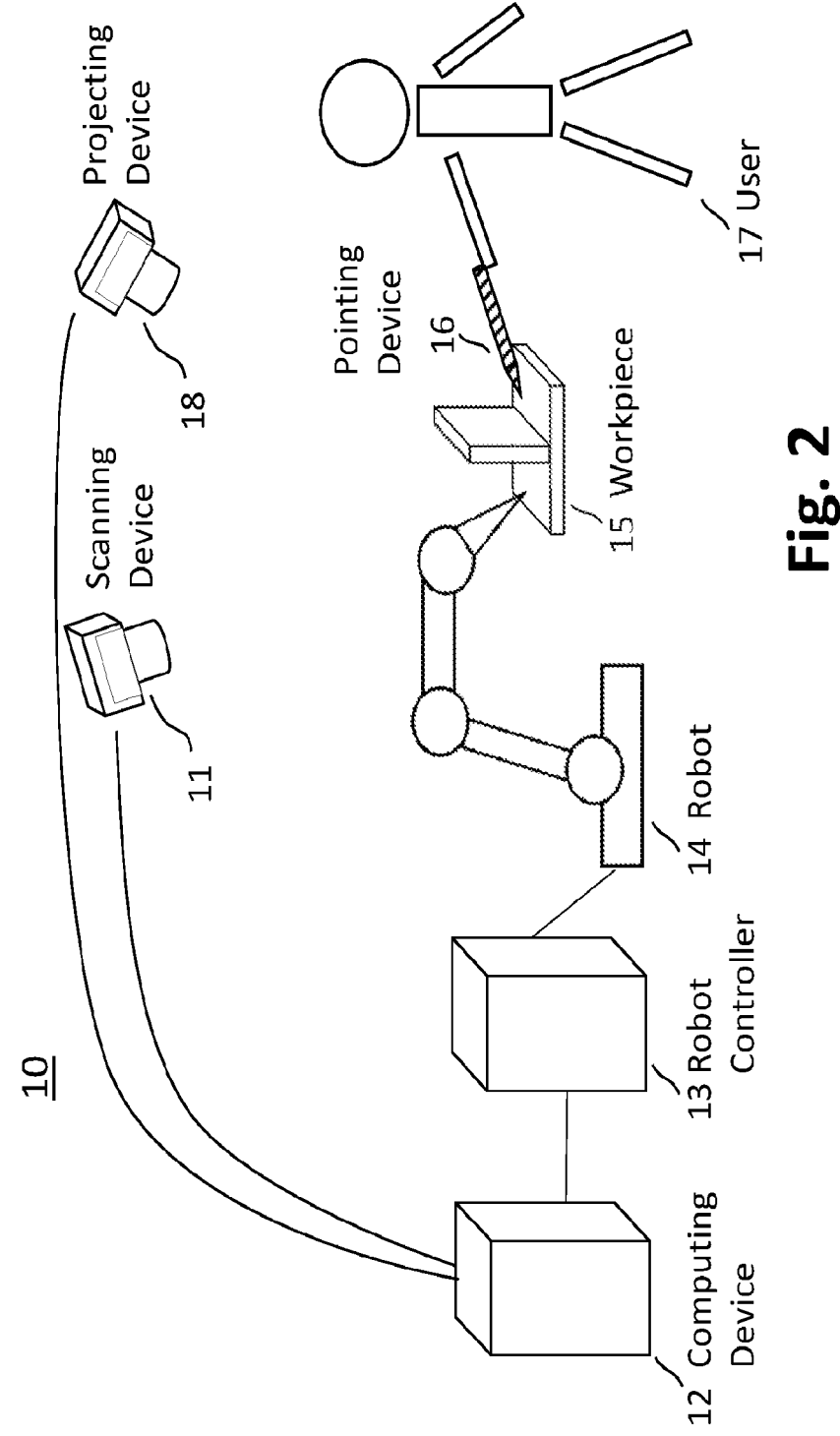
FIG. 2 is a graphical representation of the block diagram disclosed in FIG. 1.

10 robot teaching system
11 scanning device
12 computing device
13 robot controller
14 robot
15 workpiece
16 pointing device
17 user
18 projecting device
150 virtual workpiece
160 additional scanning device
170 additional computing device
180 virtual robot FIGS. 1 and 2 show a block diagram of a robot teaching system 10 with an industrial robot 14 which may be used to perform work on a workpiece 15 via a robot tool (sometimes called an end effector) located at or near a distal (non-fixed) end of the robot. The robot 14 is a programmable machine with two or more degrees of freedom whose motions may be determined by a controller 13. The robot teaching system 10 includes a scanning device 11 and a computing device 12. The computing device 12 and the robot controller 13 may or may not share the same housing and/or processing components, such as CPU, GPU, RAM, long term storage, and so on. The computing device 12 may be a processor or plurality of processors (including associated processing hardware) of a local device (fixed or handheld), a cloud-based computing system, an edge-based computing system, or a combination thereof. The scanning device 11 may be a scanner capable of capturing 2D and/or 3D geometric and/or topological information from a scanned object such as a workpiece 15. Hereafter the term "geometric information" may refer to geometric and/or topological information.

The robot program used to operate the industrial robot may be stored in components of (or associated with) the robot controller 13. The process-agnostic pointing device 16 may be held and manipulated by a user 17 such that one or more poses of the pointing device 16 may be used by the computing device 12 to calculate one or more poses to be included in the robot program that may be later used to operate the industrial robot 14 to perform work on the workpiece 15. As used herein, the term "process-agnostic" means without regard to a process that may be performed by the robot 14, for example and without limitation, milling, welding, manipulating, placing, and so on. A pose of an object is a combination of a spatial position and spatial orientation of the object. Thus, a pose of the pointing device 16 is a combination of its position and orientation. As used in this disclosure, a pose of a robot 14 is a combination of a position and an orientation of its end effector without regard to specific joint angles of the robot 14. A projecting device 18 may project images on or around the workpiece 15 to provide guidance to the user 17 for setting up the robot workspace and/or teaching the robot program.

Note that the workpiece 15 may be an object on which the robot will perform work or representative of an object on which the robot will perform work. For example, in an alternative embodiment, the workpiece 15 could have the characteristics of an object after the robot 14 performs its work such that the scan created by the scanning device 11 will match the dimensions of a finished workpiece.

The scanning device 11 can perform 3D scans by using various techniques, such as binocular vision, photogrammetry, structured light, or other 3D-sensing technologies known to those skilled in the art. the scanning device 11 may also be capable of collecting 2D RGB information and/or fusing 2D and 3D data into RGB-D representations, i.e., RGB plus depth representations as known to those skilled in the art. In one embodiment, the scanning device 11 comprises a single scanning unit (e.g., a single binocular vision 3D camera) mounted in a fixed position. In alternative embodiments the scanning device 11 comprises one or more scanning units (e.g., one or more binocular vision 3D cameras) in fixed positions and/or on movable platforms. In the case of multiple scanning units, 3D information from the multiple units can be merged into a single 3D scan by using registration techniques known by those skilled in the art.

The projecting device 18 may project shapes and patterns of single or multicolored light on the workpiece 15 and/or any area around the work piece or in the work cell. The projecting device 18 could use, without limitation, lasers or LEDS. The projecting device 18 could be any size range, such as, without limitation, a standard size or pico projector.

In an alternative embodiment, the projecting device 18 is mounted on an external axis. This axis may have one or more degrees of freedom, such as, but not limited to, a linear track, a rotating axis, a pan-and-tilt system, or any combination thereof. In a preferred embodiment, the projecting device 18 is mounted to a robot with multiple degrees of freedom, such as, but not limited to, an industrial robot arm with six degrees of freedom. In an alternative embodiment, the projecting device 18 is mounted to the same robot 14 that will perform the work on the workpiece 15.

In another alternative embodiment, the structured light may be projected by more than one projection devices 18 (e.g., by more than one standard size or pico projector). The mounting of the projection devices 18 may be fixed, or some or all of the projection devices 18 may be mounted to an external axis with one or more degrees of freedom.

A spatial relationship between the scanning device 11 and the robot 14 may be calculated by any number of calibration means known to those skilled in the art. For example, without limitation, one technique well known to those skilled in the art is for the robot 14 to hold a calibration pattern, such as a checkerboard, observable by the scanning device 11. In an alternative embodiment, a fixed observable scene that is not a specialized calibration pattern may be used. By moving the robot 14 to a number of locations while keeping the calibration pattern within view of the scanning device 11, a calibration transformation matrix may be created using calculations known to those skilled in the art based on the locations of features on the calibration pattern and the locations of the robot 14 when it moved the calibration pattern to the said number of locations. In an alternative embodiment, the scanning device 11 may be mounted on the robot 14. In this embodiment, a procedure similar to the aforementioned procedure may be performed, with the exception that the calibration pattern is fixed and the robot 14 would move to a number of locations while keeping the calibration pattern in view of the scanning device 11 held by robot 14. Then a calibration transformation matrix may be created using calculations known to those skilled in the art based on the locations of features on the calibration pattern and the locations of the robot 14 when the scanning device 11 observed the calibration pattern at the said number of locations.

The spatial relationship between the projecting device 18 and the robot 14 may be calculated by any number of calibration means known to those skilled in the art. For example, without limitation, the scanning device 11 may be mounted on the robot 14. In this embodiment, a calibration pattern may be projected by the projecting device 18 and the robot 14 would move to a number of locations while keeping the calibration pattern in view of the scanning device 11 held by robot 14. Then a calibration transformation matrix between the projecting device 18 and the robot 14 may be created using calculations known to those skilled in the art based on the locations of features on the calibration pattern and the locations of the robot 14 when the scanning device 11 observed the calibration pattern at the said number of locations. In an alternative embodiment, the robot 14 may hold the projecting device 18 and the scanning device 11 may be fixed while it observes the calibration pattern projected while the robot 14 moves to a number of locations. In like manner to the aforementioned embodiment, calculations known to those skilled in the art are used to calculate the transformation matrix between the robot 14 and the projecting device 18 and the scanning device 11.

The spatial relationship between the scanning device 11 and the projecting device 18 may be calculated by any number of calibration means known to those skilled in the art. For example, without limitation, when the transformation matrix between the robot 14 and the scanning device 11 is determined as mentioned above, and the transformation matrix between the robot 14 and the projecting device 18 is determined as mentioned above, the transformation between the scanning device 11 and the projecting device 18 may be calculated by using the two previously calculated transformations by using means known by those skilled in the art. In another embodiment, the projecting device 18 may project features on a flat surface that is observable by the scanning device 11. In this embodiment, the location of the projected features may be determined by the scanning device 11 and a transformation matrix may be calculated between the projected features and the location of the scanned features using means known by those skilled in the art. As can be appreciated, the scanning device 11 and the projecting device 18 may be mounted on a common platform, which in turn may be mounted in a fixed position or held by the robot 14.

Figure 3:
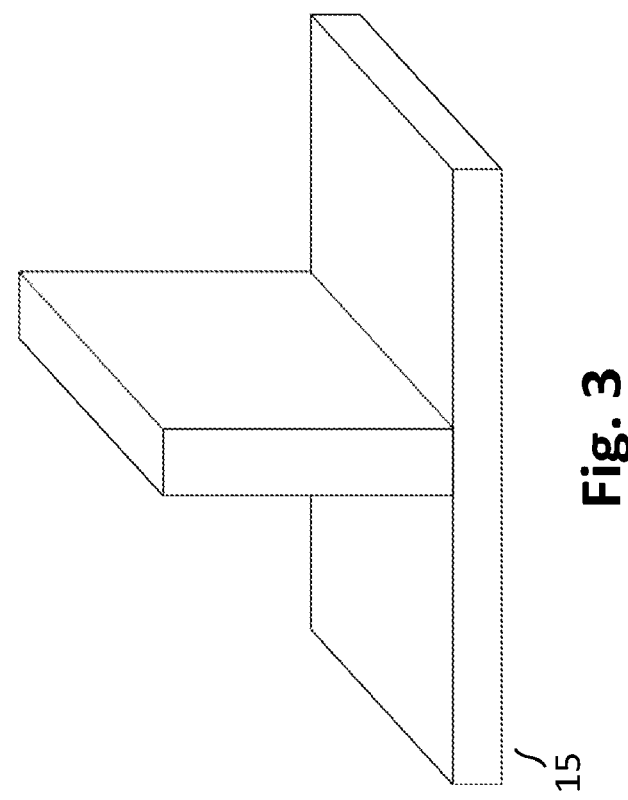
FIG. 3 shows a sample workpiece on which the robot would perform work.

FIG. 3 shows a simple workpiece 15 to be operated on by an industrial robot 14. The robot operation performed on the workpiece could be any type of operation, such as but not limited to welding, deburring, painting, pick and place, or inspection. It is important to note the workpiece 15 that is scanned by the scanning device 11 does not necessarily need to be the exact same object that the robot 14 will perform work on as long as the geometry of the scanned workpiece 15 is substantially the same as the workpiece that the robot will perform work on.

Figure 4:
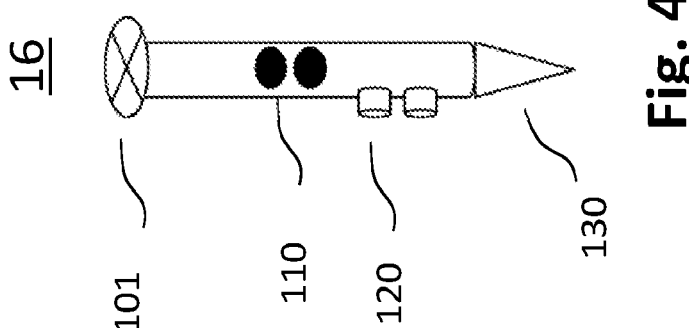
FIG. 4 shows an embodiment of a process-agnostic pointing device.

FIG. 4 shows a preferred embodiment of a process-agnostic pointing device 16. The pose of the process-agnostic pointing device 16 may be tracked by the scanning device 11 using visual tracking algorithms known by those skilled in the art, or the pose may be tracked using other means such as, but not limited to, time of flight sensing or IR LEDs. The process-agnostic pointing device may include feedback means to provide information to the user while the user moves the pointing device 16 to one or more poses for the purpose of programming the robot. One embodiment includes multiple colored LEDs 110 on the pointing device 16 to indicate status information such as, but not limited to, an LED that turns either green or red to indicate whether the pose of the pointing device 16 is being observed by the scanning device 11. Another embodiment may use one of the LEDs 110 to indicate that a pose was saved and is reachable by the robot 14. Another embodiment may use one of the LEDs 110 to flash when a wireless communication between the pointing device 16 and the computing device 12 has failed. These are only meant as representative embodiments, as there are many possible states and conditions that may arise during the teaching operation, and these can be communicated to the user via, without limitation, LEDs, haptic feedback (such as small vibrations), sound, or other feedback means. In additional embodiments, visual feedback may be provided through, without limitation, computer screens, such as a laptop, tablet computer or smart phone, and/or augmented reality.

During the teaching operation, the user 17 may indicate that a current pose of the pointing device 16 should be recorded and used to generate the robot program. The generated robot program may be comprised of robot motion commands and/or other commands, such as setting input and/or output signals (IOs), or other typical industrial robot instructions known to those skilled in the art. The robot program could be either a complete stand-alone program or a series of commands that are incorporated in a larger program at a later time. In one embodiment, the user presses one of the buttons 120 on the pointing device 16. Additional buttons, dials, scrollable wheels, or other input means can be used to input robot-program parameters and/or robot-program states, such as increasing the speed, turning a weld gun on or off, when to close a gripper, whether the motion is a process motion or a non-process motion (e.g., a weld motion or simply moving through a space without welding), and so forth. The robot-program information (i.e., robot program values), such as poses, robot parameters, and/or robot-program states, may be shown to the user on a graphical user interface. Other robot actions or robot parameters may be associated with these types of user inputs in keeping with the spirit of the invention. The buttons 120 in FIG. 4 are meant to be representative of possible input means, but other options are possible in keeping with the spirit of the invention.

FIG. 4 shows a fiducial marker 101 at an end of the pointing device 16, opposite from where the pointing device 16 is pointing its tip 130. This fiducial marker 101 could be a unique 2D symbol seen by the scanning device 11 that may be recognized by the computing device 12 and used for locating the end of the pointing device 16. Several image recognition algorithms are useable by someone skilled in the art to accurately detect and locate the 2D symbol and calculate the corresponding location of the tip 130. Alternative embodiments include, without limitation, having multiple fiducials, different locations of the fiducials, active emitters (such as LEDs), fiducials whose locations and/or orientations are adjustable, or one or more 3D shapes that can be used to track the end of the pointing device 16.

Figure 5:
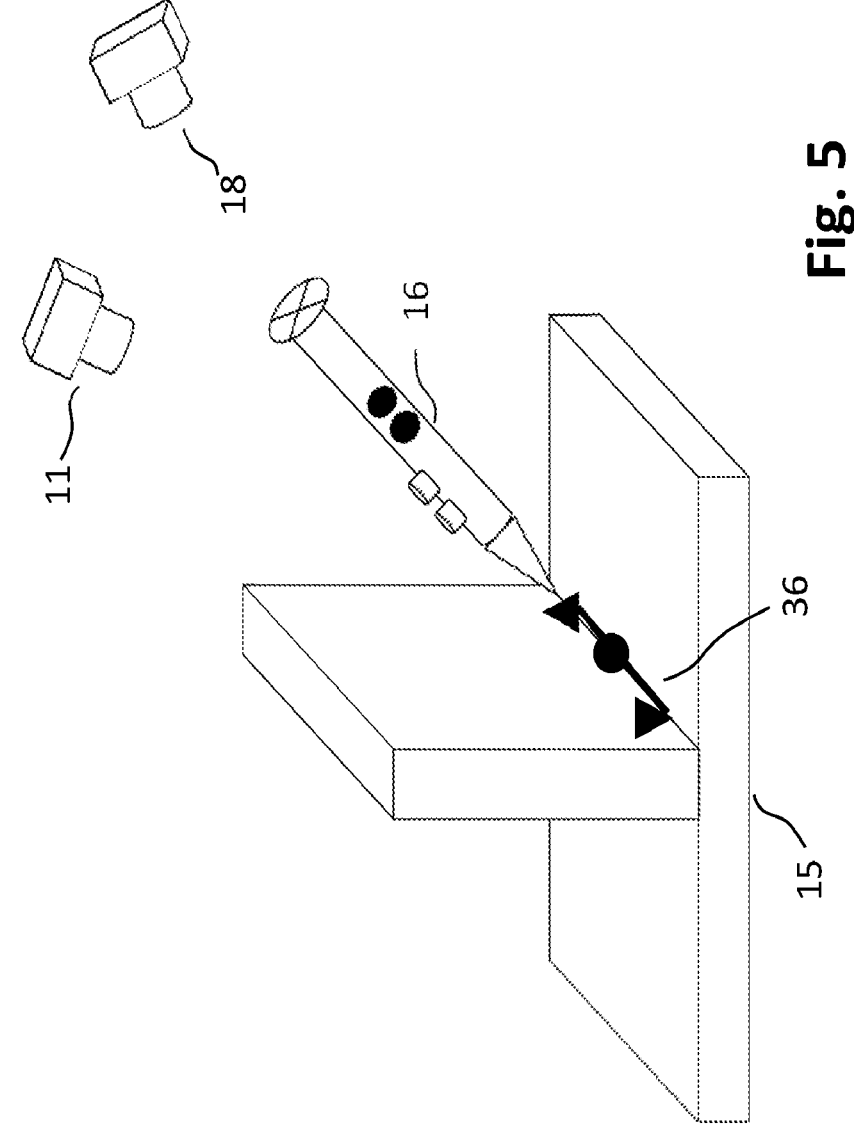
FIG. 5 shows an example of the process-agnostic pointing device pointing to a location for the robot to perform work on a sample workpiece.

FIG. 5 shows a simple work piece 15 to be operated on by the industrial robot 14, where the process-agnostic pointing device 16 positioned by the user 17 such that the pointing device 16 indicates a pose to be used by the computing device 12 to generate robot instructions for the robot 14 to operate on the workpiece 15. FIG. 5 also shows the scanning device 11 that observes the pointing device 16 so that the scanning device 11 may accurately communicate the pose of the pointing device 16 to the computing device 12 so that the computing device 12 may use such user-selected poses to generate robot instructions. In an alternative embodiment, projecting device 18 may project the user-selected poses and/or other robot-program information while the user 17 indicates poses to be used by the computing device 12 to generate robot instructions. For example, projected image 36 may be projected by projecting device 18 onto workpiece 15 to indicate the user-selected poses to start or stop a robot process and the via pose(s) between the start and stop poses. The start pose, via pose(s), and stop pose may be indicated by a downward pointing triangle, circle, and upward pointing triangle, respectively. As can be appreciated, other shapes and/or colors may be used to indicate other robot-program information such as speed, zone, other poses, and so forth. The term "pose type" may be used herein to describe a type of pose, including without limitation, a start-movement pose, a start-process pose, a via (intermediate) pose, a stop-movement pose, and a stop-process pose. The pose type may also include related parametric information, such as robot-movement parameters (e.g., velocity, acceleration, etc.), tool-operation (end-effector) parameters (e.g., rotational speed, welding speed, etc.), tool-change parameters (e.g., replace drill bit, select smaller end mill, etc.), zone parameters (e.g., reachable zones, safety zones, etc.), control-signal parameters (digital signals, analog signals, etc.), user-interface parameters (e.g., wait for user input, pause, delay), and so on.

Figure 6C:
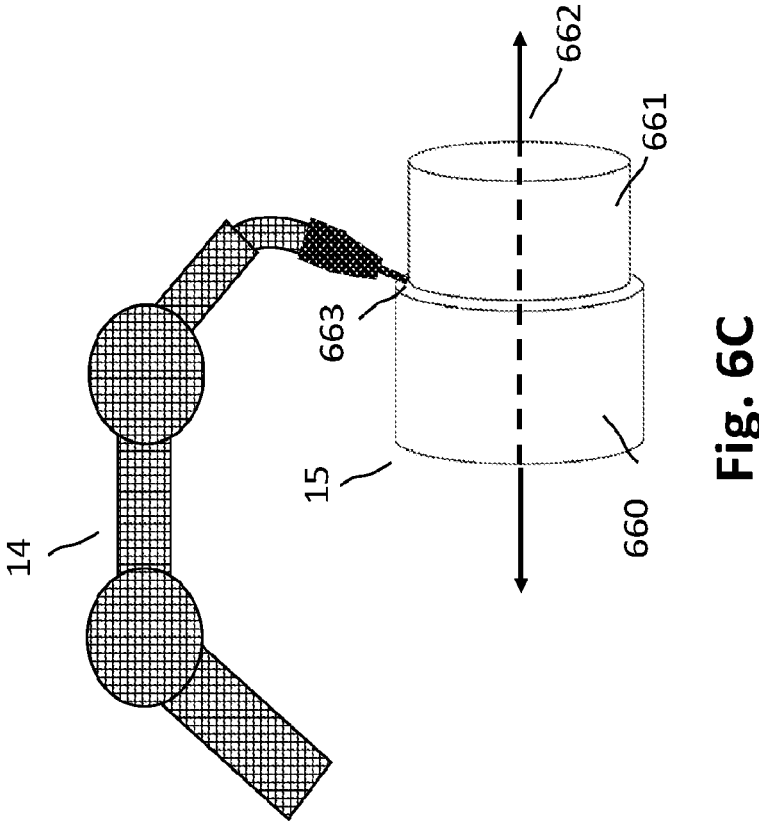
Figure 6B:
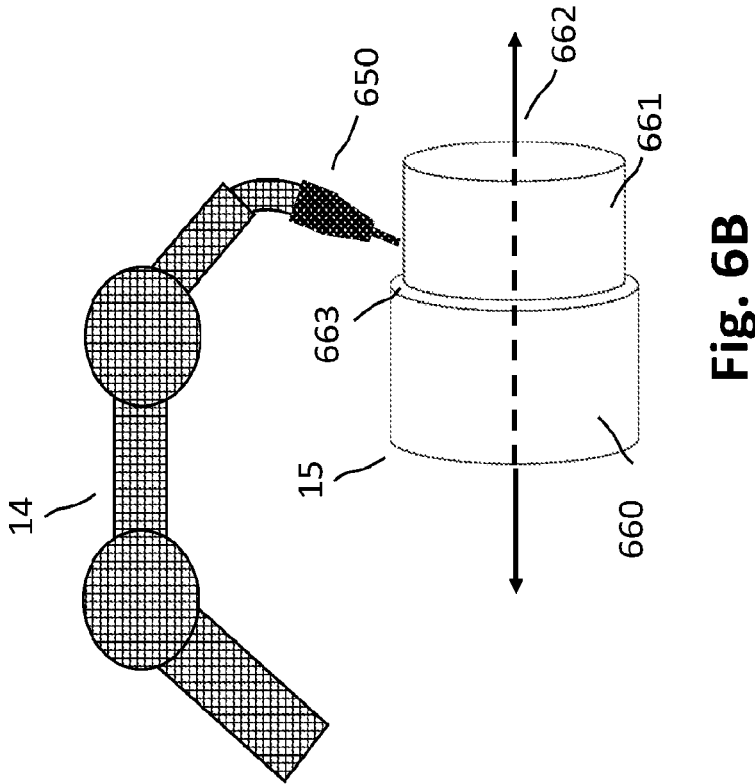

FIG. 6A shows a flowchart for a method 600 that uses a scanning device 11, a computing device 12, and a process-agnostic pointing device 16 to create instructions for the robot 14 shown in FIGS. 6B-6C to perform an operation on a workpiece 15. Additionally, a projecting device 18 (not shown) provides feedback to a user 17 (not shown) as the user 17 positions a pointing device 16 (not shown) during the process of recording desired poses.

At step 602, the workpiece 15 is placed in view of the scanning device 11. This may or may not include putting the workpiece 15 in a fixture, depending on the intended robotic process to be performed. It should be noted that the workpiece 15 to be scanned may be an object that either is the actual workpiece on which the robot will perform the operation, or an object that accurately represents the dimensions and shape of the actual workpiece.

At step 604, a 3D scan is performed on the workpiece 15. The 3D scan creates a 3D representation of the object that is temporarily or permanently stored the computing device 12. The 3D scan may be performed in a number of ways, as known to those skilled in the art. This includes using a 3D vision system which combines multiple views of the workpiece and thereby eliminating gaps caused by occlusions from one or more viewpoints. The multiple views may be achieved through several means, such as having more than one stationary vision systems, by moving a single vision system to multiple viewpoints, or by a combination of stationary and moving vision systems. The vision systems could use binocular vision, photogrammetry, structured light, or other 3D sensing technologies known to those skilled in the art. The end result of the scan is that a 3D representation of the workpiece 15 is stored in the computing device 12. The 3D representation may take many forms, such as a point cloud, triangle mesh, non-uniform rational B-splines (NURBS) surface models, or any other representation used by those skilled in the art. Optional post processing may be performed on the 3D representation, such as smoothing, plane fitting, fitting of cylinders, hole filling and other steps that are known to those skilled in the art of 3D scanning.

As another alternative embodiment, a human user 17 may hold the scanning device 11 and scan the workpiece 15 by moving the scanning device 11 to one or more positions from which the scanning device 11 can capture 3D information through means known to those skilled in the art. In one such embodiment, the scanning device 11 is integrated with a tablet computer or smart phone. In another such embodiment, the scanning device 11 is removably attached to a tablet computer or smart phone. In another such embodiment, the scanning device 11 is a stand-alone device.

After scanning the workpiece, the user 17 may mount the scanning device 11 to a fixed or movable device. In one such embodiment, the fixed device is a tripod. In another such embodiment, the movable device is a robot.

At step 606 in the process, after the 3D scan of the workpiece takes place, a process-agnostic pointing device 16 is held and positioned by the user 17 at one or more positions to indicate where the robot 14 is intended to perform its operation(s). The pose of the pointing device 16 is observed by a scanning device 11 to provide a potential input pose. (Note that a potential input pose can be provided by other means described elsewhere herein.) Given a potential input pose, and the computing device 12 calculates the relationships between the potential input pose, the 3D representation of the workpiece 15, and the coordinate system of the robot 14 using calibration techniques known to those skilled in the art. Before the user 17 begins to teach one or more poses, the user 17 may select a teaching profile, also known as a template. (Note the terms "profile" and "template" are used interchangeably herein, both referring to one or more configurable settings, and the various profile and template types, associate values, and uses are described elsewhere herein.) In the case of step 606, the teaching profile or template is used to configure the user interface as the user 17 teaches poses as well as configure some of the calculations during tuning and calculations steps 616 through 628.

The profile may contain information such as, but not limited to, geometry type, motion type, process type, and other process details. For example, a geometry type could be a "corner" or "edge," a motion type could be "linear" or "circular," a process type could be "lap weld" or "face milling," and other process details could be "weld a 5 mm bead" or "mill at 5000 rpm." The following are examples, without limitation, of how the robot teaching system 10 may combine such features described above into a profile: "Circular Lap Weld for an Overlapping Cylinder," "Linear Corner Weld," "Planar Face Milling," or "Glue Dispensing Along an Edge." Furthermore, for example, when "5 mm Bead Lap Weld for an Overlapping Cylinder" is selected, the user interface and/or projecting device 18 may provide feedback and prompts the user to teach poses for the circular motion and the robot teaching system 10 knows to use cylindrical geometries for the tuning steps and the corresponding torch angles and welding parameters when it calculates the robot instructions and robot-program information (see steps 616 through 628). The feedback includes, for example and without limitation, displaying the potential input pose and a closest corresponding point of the current potential input poses on a cylinder on the workpiece 15. When "Deep Planar Face Milling at 2500 RPM" is selected, the user interface and/or projecting device 18 provides feedback and prompts the user 17 to teach poses for the boundaries for the planar motion and the robot teaching system 10 knows to use a planar geometry and corresponding tool speeds for the tuning steps and for when it calculates the robot instructions and robot-program information (see steps 616 through 628). The feedback includes, for example and without limitation, displaying the potential input pose and a closest corresponding point of the current potential input poses on a plane on the workpiece 15. Such prompting includes, for example and without limitation, displaying both the current pose of the pointing device 16 and displaying another pose that is the pose closest to both a plane on the workpiece 15 and the pose of the pointing device 16 so that user may know how the current pose of the pointing device 16 may be used by the robot training system 10. The aforementioned examples of displaying the closest corresponding point on a cylinder on the workpiece 15 (i.e., the point on the cylinder that has shortest distance to the potential input pose) and displaying the closest corresponding point on a plane on the workpiece 15 (i.e., the point on the plane that has shortest distance to the potential input pose) are examples of calculating and showing the results of a calculation of a predefined relationship between a pose and the 3D scan of the workpiece 15 or geometric features derived from the 3D scan (e.g., evaluating a geometric relationship between geometric information of the workpiece and a pose and displaying a representation of the geometric relationship). Other examples could include, without limitation, displaying the closest point to an intersection between two planes on the workpiece 15, or the closest point to an edge on the workpiece 15. Determining and displaying a closest point on the workpiece from a point of a potential pose for the robot (e.g., a shortest distance from a point on an end effector to a geometric feature of the workpiece) may be utilized by the robot teaching system 10 to effect a snap-to-pose feature.

In one embodiment, the calibration means between the coordinate system of the robot 14 and the 3D representation of the workpiece 15 is based on the calibration techniques mentioned elsewhere herein that produce a transformation matrix between the robot 14 and the scanning device 11 that built the 3D representation. Similarly, a calibration between the scanning device 11 and the process-agnostic pointing device 16 may be created using techniques known to those skilled in the art. For example, without limitation, the process-agnostic pointing device 16 may touch features on a calibration pattern where the process-agnostic pointing device 16 and the features on the calibration pattern are both observable by the scanning device 11. Then a calibration transformation matrix may be created using calculations known to those skilled in the art based on the locations of features on the calibration pattern and the locations where the process-agnostic pointing device 16 was touching features on the calibration pattern at said several locations. Once the calibration transformation matrix between the scanning device 11 and the process-agnostic pointing device 16 is known and the calibration matrix between the coordinate system of the robot 14 and the scanning device 11 is known, the entire calibration and transformation chain for the coordinate systems of all these components may be derived by techniques known to those skilled in the art.

As an alternate embodiment, the scanning device 11 for scanning the workpiece 15 may be different from the scanning device 11 used to record the pose of the pointing device 16. For example, without limitation, a 3D point cloud generating device may be used as the scanning device 11 to collect the 3D information of the workpiece 15 while a high-resolution camera may be used to track the pointing device 16 in 3D space using means well known to those skilled in the art. Other combinations or embodiments are possible while keeping with the spirit of the invention.

Due to possible occlusions between a single scanning device 11 and the pointing device 16, multiple views of the pointing device 16 may be desired or needed. Similar to what is described above for providing multiple views of the workpiece 15, multiple views of the pointing device may be achieved by using a 3D vision system that combines multiple views of the workpiece and thereby eliminating gaps caused by occlusions from one or more viewpoints. The multiple views may be achieved through several means, such as having more than one stationary scanning device 11, by moving a single scanning device 11 to multiple viewpoints, or by a combination of stationary and moving scanning devices 11. In the case of a moving scanning device 11, the scanning device 11 may be mounted on a robot and the robot may then be used to move the scanning device 11 by following the pointing device 16, by the user 17 jogging a robot, by the user 17 selecting one of several predefined viewing locations, or any other robot moving means known to those skilled in the art. The robot motion used to move the robot mounted scanning device 11 may be achieved while the operator is collocated with the robot in the robot cell by using a safety monitored stop, speed and separation monitoring, power and force limits, or other safety means known to those skilled in the art. Alternatively, a moving scanning device 11 may be mounted on a track, pan-and-tilt system, or similar device.

At step 608, after moving the pointing device 16 (or other input means described herein) to the appropriate pose, the user 17 indicates that the pose of the pointing device 16 should be recorded by the computing device 12. This may be done via buttons 120 on the pointing device 16 or other standard input means. Later in the process, the computing device 12 then uses the recorded pose(s) of the user 17 guided pointing device 16 to generate robot commands that perform operation(s) on the workpiece 15.

At step 610 in the process, the pose selected by the user 17 in step 608 is stored in the computing device 12.

At step 612, the pose stored in the computing device 12 during step 610 is optionally projected on the workpiece 15 by the projecting device 18. The location of the projected point is determined by using the transformation of the coordinate system of the scanning device 11 to the coordinate system of the projecting device 18 using the methods described earlier herein or by using other means known by those skilled in the art. If more than one pose has been selected by the user 17, all the poses and lines connecting the sequence of poses may be projected on the workpiece 15. In an alternative embodiment, a subset of the poses and lines connecting the sequence of poses may be projected on the workpiece 15 based on user-defined settings, such as, but not limited to, only showing poses and lines within a predefined distance from the last recorded pose. In another alternative embodiment, the potential poses and/or connecting lines may be projected on the workpiece 15 in a special color in order to show the user 17 what will be recorded if the user 17 makes the current selection.

In an alternative embodiment, various shapes and colors may be used to indicate different information in what is displayed on the user interface and/or projected on the workpiece 15. This includes, without limitation, different shapes and/or colors to indicate the start of a process, such as the start of a weld, different shapes and/or colors to indicate the end of a process, such as the end of a weld, and different shapes and/or colors for intermediate motions between poses recorded by the user 17. Additional shapes and/or colors are projected for additional actions, such as, without limitation, setting an IO, changing a tool parameter (such as rotation speed or a welding parameter), or waiting for an input.

At step 614, a decision is made as to whether additional poses are to be recorded. In one embodiment, the default decision is to continue collecting more poses until the user 17 indicates that no more poses are needed by pressing one of the buttons 120 on the process-agnostic pointing device 16 or an alternative input means known to those skilled in the art. To collect more poses, the process returns to step 606. In the preferred embodiment, if the user 17 indicates no more poses are needed, then the process continues to step 616.

In an alternative embodiment, the user 17 may optionally tune some of the information collected in previous steps. In this alternative embodiment, this optional tuning step prior to instruction generation, comprises taking additional 3D data which is used to create more accurate robot instructions to perform work on a workpiece. In one embodiment of the tuning, the robot teaching system 10 autogenerates a path for the robot to move a contact sensor to touch key features of the workpiece 15. In FIGS. 6B-6C the workpiece 15 comprises two cylindrical pieces 660 and 661 that are lap welded together by the robot instructions generated at later step 616. The cylindrical pieces 660 and 661 share a common axis

662. The geometries of 660 and 661 were created during step 604 using the 3D scan data and cylinder fitting algorithms known to those skilled in the art, as described above. The robot teaching system 10 is informed about the types of geometries of interest, in this case cylinders, through an automatic analysis of the 3D scan data and/or by the user 17 specifying the types of geometries of interest through selecting a template with robot process type and/or geometric information. Since the scan data generated at step 604 may not be guaranteed to be accurate enough for the process, arc welding in this case, additional and more accurate 3D information is gathered in this optional tuning step to improve the quality of the robot instructions and related information generated by the robot teaching system 10. In this embodiment, the robot 14 may be equipped with a contact sensing tool 650. The robot teaching system 10 knows the geometries of the workpiece as described above and creates search paths to touch the cylinders 660 and 661 using a contact sensor and collect even more accurate information about the shape of the cylinders based on the contact locations. Alternatively, the contact sensor may be replaced by a non-contact sensor such as, but not limited to, a laser distance sensor or a proximity sensor such as, but not limited to, a capacitive sensor, an infrared sensor, an acoustic sensor, and so on. The robot search paths comprise a start location of a preset distance away from the geometry (e.g., 10 mm), where the search paths command the robot 14 to slowly approach the geometry of interest, in this case cylinder 660 or 661, until the contact sensing tool 650 touches the geometry. After touching each geometry, the new location information is used to either directly calculate the pose or poses that are produced in step 616 or they are used to create more accurate geometry information first using the same geometry fitting algorithms described in step 604 which in turn are used to calculate the pose or poses produced in step 616. Additionally, in the case of a lap weld, the robot teaching system 10 generates a robot search path to find the lap 663 based on the more accurate geometry information for cylinders 660 and 661.

As shown in FIG. 6B, the robot teaching system 10 calculates a small offset from cylinder 661 and a robot search path direction parallel to the common axis 662 and towards the lap 663 at the edge of cylinder 660. As shown in FIG. 6C, the robot search stops when the contact sensor comes in contact with lap 633, and the location at the point of contact is recorded. One or more robotic searches for the lap locations can be performed in this manner at various locations along the lap 663 based on preconfigured settings, user-selected templates, or user-selected options. Offset distances and other search-path options may also be based on preconfigured settings, user-selected templates or user-selected options. The more accurate information from the search results is used to directly calculate the pose or poses for the weld path or it is fed back into the scanned information of the robot teaching system 10 to create more accurate geometry information using the same geometry fitting algorithms described in step 604. The more accurate geometry information thus enables higher accuracy in the robot instructions created at step 616 than could have been created using the less accurate scan data from 604 alone. As can be appreciated, other searches or input means can be performed in like manner to find planes, edges, corners, and other geometries or features based on either contact sensors, or other sensors, such as, but not limited to, laser scanners or other scanning devices. These various input means may also be configurable based on preconfigured settings, user-selected templates, or user-selected options, such as, but limited to, defining the type of input, required robot motions, regions of interest, types and/or sizes of geometries and/or geometric components, and so on, collected by the additional input means (some exemplary types of input, for example with respect to a sensor, may be input from a laser scanner and input from a contact sensor). This enables the optional tuning step prior to instruction generation to automatically tune the scanned information for a wide variety of geometries and process types, such as, but not limited to, welding, material removal, dispensing, and painting.

As an alternative embodiment, the user 17 may also be able to input or tune some or all of the poses or input more accurate geometry information through any number of additional user-input means, including but not limited to, input by gestures, jogging the robot, using lead through to move the robot, XXX add: jogging such as by joystick or buttons . . . lead through such as manually manipulating the end effector of a cobot XXX or editing values on a user interface. At step 616, the computing device 12 processes both the 3D scan information collected in step 604 and all the recorded poses from the combination of steps 606 through 612, and, if used, the optional tuning step prior to instruction generation. Step 618 is another optional step, where poses may be tuned after robot instructions are calculated in step 616 using any of the tuning procedures described herein, especially those described for the optional tuning step prior to instruction generation. The optional tuning step prior to instruction generation, as well as later tuning, and any of the validation steps in 618 through 628, may be repeated any number of times until a desired or required quality is achieved.

In an alternative embodiment, instead of using the process-agnostic pointing device 16, potential input poses may be provided by the user 17 at step 606 by the scanning device 11 observing hand gestures made by the user 17. In this alternative embodiment, at step 608 the user would indicate when to record a desired pose by one gesture and at step 614 indicate by other gestures whether recording of more poses is desired or required. In another alternative embodiment, instead of using the process-agnostic pointing device 16, potential input poses may be provided by the user 17 at step 606 by using a dummy tool whose shape may resemble that of end effector or a tool-tip appropriate for the robotic process being taught. In this alternative embodiment, at step 608 the user would indicate when to record a desired pose by using a button on the dummy tool and at step 614 indicate whether recording of more poses is required via other buttons on the dummy tool. In another alternative embodiment, instead of or in addition to using the process-agnostic pointing device 16, potential input poses provided by the user 17 may be specified at step 606 by the user 17 moving the robot 14 to the location of the desired pose to record. The robot 14 may be moved by a number of means, such as, but not limited to, one of or a combination of the following means: lead through, jogging via a joystick, or jogging via a teach pendent. In this alternative embodiment, at step 608 the user would indicate when to record a desired pose by any number of means, such as, but not limited to, a button on the robot, a button on a teach pendent, or a gesture observable by the scanning device 11. In this alternative embodiment, when the robot 14 is moved to the location of the desired pose to record, the step 612 (where the pose and/or path are displayed) is an optional step and the projecting device 18 is optional equipment. In another alternative embodiment, potential input poses may be provided by the user 17 at step 606 by using a combination of the process-agnostic pointing device 16 and the user 17 moving the robot 14 to specify the desired pose to record.

In one embodiment of step 616, the computing device 12 analyzes the shapes created by scanning the workpiece 15 during step 604, focusing on the shapes in close proximity (for example, without limitation, within a predefined distance of 5, 10, or 100 millimeters) to the poses taught in steps 606 through 614. For example, without limitation, the computing device 12 would perform a best fit for predefined shapes, including, without limitation, lines, planes, partial cylinders, or partial spheres in the scanned 3D representation of the workpiece 15 by using geometry fitting algorithms known by those skilled in the art. The computing device 12 then creates robot-motion instructions based on locating the closest points to the poses taught in steps 606 through 614 and a best fit geometry, or by the intersections of two or more of the best fit geometries (such as, but not limited to, the intersection of two planes), or by the edge of one of these best fit geometries (such as, but not limited to, the edge of a plane or a cylinder). This approach creates high quality points on the workpiece 15 even if the user did not teach poses accurately in relation to the workpiece 15. When more than one geometry or edge could be used to find the closest point, the geometry or edge may be selected by the robot teaching system 10 by using options that fit the teaching profile or template previously mentioned herein.

In an alternative embodiment, the computing device 12 may create robot-motion instructions based on the closest points to the poses taught in steps 606 through 614 and the center of the closest geometric shape in the 3D scan information, such as, without limitation, a rectangle, circle, or triangle. In an alternative embodiment, the computing device 12 may create robot-motion instructions based on locating the closest points to the poses taught in steps 606 through 614 and the intersection of an edge of one of the best fit geometries. In an alternative embodiment, the calculation of the closest points between part or all of the 3D representation and geometric information associated with workpiece 15 and the pose taught by the user 17 may be determined during step 606 using the aforementioned methods, and this may be done while the user 17 is still in the process of indicating a pose but has not confirmed the final pose to record in step 608. In this embodiment, this potential or candidate input pose (before the user 17 indicates a desire to record it) is shown to the user 17 on a graphical interface or by projections, augmented reality, or other means. The aforementioned closest point to part or all of the 3D representation and geometric information associated with the workpiece 15 is also shown to the user 17. Showing the candidate pose, and its closest associated point, to the user 17 helps inform a selection of a pose before the user 17 confirm the selection in step 608. The feature of showing the closest associated point can be optionally turned on and off by the user 17 or automatically turned on and off based on the distance between the candidate pose and the closest associated point. Showing the closest associated point also optionally includes orientation information. This orientation may be based on any number of factors, such as but not limited to, the surface normal at that point, predefined process parameters (such as lead or lag angle based on the trajectory of the sequence of poses currently being input), and so on.

As mentioned previously, when more than one geometric feature could be used to find the closest point, the geometric feature may be selected by the robot teaching system 10 using options that fit the teaching profile or template previously mentioned herein. As can be readily appreciated, the closest associated point (i.e., point with the shortest distance) described above may be based on criteria other than a strict definition of distance to any part of the 3D representation and geometric information associated with the workpiece 15. For example, without limitation, other association criteria may be used, such as using smoothing functions to average out noise in the 3D representation before calculating the closes point, or finding the closest point on the edge or intersection of geometric features (such as the intersection of two planes) instead of finding the closest point anywhere on the 3D representation of the workpiece 15. The orientations contained in the robot-motion instructions can also be calculated by the computing device 12 by, without limitation, using the best fit geometries. For example, an angle of intersection between two best fit geometries can be halved to determine one or more orientation angles for a robot-motion instruction. In an alternate embodiment, the normal of a best fit geometry could be used.

Referring now to steps 618 to 624, the user 17 tunes the robot instructions generated in 616, any parameters related to those instructions, and/or any information used to generate those instruction (such as the input poses or geometric information). Although this is an optional step, it is the preferred embodiment to include this step in order to ensure the paths created for the robot are of sufficiently high-quality. Many tuning means can be used in step 618. For example, the user 17 observes the calculated robot instructions from step 616 in simulation and modifies those points by directly changing values of those robot instructions; then the results of those modifications are simulated in step 622 and evaluated in step 624. The result of step 624 determines if the process should continue to step 626 or return to the retuning step 618. Note that it is also possible for the user 17 to decide to return to an even earlier step if the root cause of low-quality instructions is due to something earlier in the teaching process, such as returning to rescanning in step 604 or reteaching poses in steps 606 through 614. If the user decides to return to an earlier step, poses can also be modified (tuned), as well as added or deleted. When the user 17 tunes instructions in step 618, the tuning may include changing positions and/or orientations. For example, changing a position or orientation associated with an instruction is done to enable reachability or to avoid a collision.

Alternatively, tuning at step 618 may include something similar to the optional tuning step prior to instruction generation previously described herein, in which geometric information is updated to make the instructions in the path more accurate. Note that geometric information is also available in simulation by allowing the user 17 to see geometries in simulation (for example and without limitation, planes, cylinders, and edges) and adjust their location, orientation, and/or size. Furthermore, since the geometries are based on information collected in the 3D scan in step 604, when the user 17 observes that a geometry is potentially inaccurate, the user 17 may have the option to include or exclude some of the 3D scan information that was used to calculate the best fit geometry. For example, the user 17 may adjust a region of interest to select which points to include in the calculation of a plane or cylinder, and then trigger the robot teaching system 10 to recalculate the geometry based on the newly included and/or excluded points. When the user 17 tunes geometries (or geometric features) in these ways, the calculated robot instructions are recalculated based on the tuned geometries. Thus, a variety of tuning methods may be provided using input from simulation and/or the real world, and the user 17 may use any combination and iterations of tuning in step 618, testing in step 622, and evaluating in step 624.

After the work path is determined to have satisfactory behavior by the user 17, the preferred embodiment includes step 626 where an autotune path is tested in simulation. The autotune path at this point is very much like the path described in the optional tuning step prior to instruction generation previously described herein, where a path is generated to find key geometric features associated with the profile or template that the user 17 selected for the path being tuned. The autotune path may be optionally validated in simulation and/or optionally tuned by the user 17 as well. The next step, which is in the preferred embodiment but is also optional, is to run the autotune path on the real robot in step 628. When the autotune path collects information from the real workpiece 15, that information may be used to update points for the path that will perform work on the workpiece 15. The points may be updated by updating the underlying geometric information associated with the path and recalculating the points using the methods described in step 616, or the points that are found in the autotune step may be copied directly to the corresponding points in the path that will perform work on the workpiece 15. After the user 17 has performed and possibly repeated as many of the input, tuning, and test steps to reach a desired or required quality, the process reaches step 630 and the path is ready to perform work on the workpiece 15. As can also be readily appreciated, the steps in FIG. 6A can be repeated any number of times to create a robot program with more than one path.

In an alternate embodiment, the process rules and/or heuristics known by those skilled in the art for welding, painting, material removal, and so on may be combined with the best fit geometries and the recorded poses and sequences of poses taught in steps 606 to 610. For example, without limitation, the computing device 12 may use a previously specified robot tool angle for the welding process, combined with halving the intersection angle of two planes, to calculate a very accurate tool orientation used in the robot-motion instructions. This orientation, combined with calculating the closest projection of the recorded pose taught in steps 606 to 610 on the intersection line of two best fit planes, would provide a highly accurate position and orientation for the robot-motion instructions. In an alternative embodiment, the sequence of poses is analyzed in order to adjust the positions and/or orientations of the robot motions instructions. For example, the trajectory between two poses may be calculated for every sequence of two poses selected through the process described in steps 606 through 614. A predefined, user-defined or heuristics-based lead or lag angle may be calculated for the robot-motion instructions based on the trajectories calculated for every sequence of poses. Other rules and/or heuristics for other applications are possible in keeping with the spirit of the invention.

In an alternate embodiment, the computing device 12 may create additional robot instructions based on the computing device 12 recognizing a particular process. For example, for a welding path, the computing device 12 may add additional points at the start and end of the welding path robot-motion instructions with a predefined distance offset to enable the robot to safely approach and depart from the workpiece 15 before and after the welding-motion instructions, respectively. In another example, for a machining path, the computing device 12 may add points at the start of the milling path robot-motion instructions with a predefined distance offset to enable the robot 14 to start the milling tool and then safely approach the workpiece to perform the milling work. Likewise, the computing device 12 may add points at the end of the milling path robot instructions with a predefined offset to enable the robot 14 to depart from the workpiece 15 safely and stop the milling tool. As can be readily appreciated, many more process-based rules may be used to generate additional robot motion and non-motion instructions automatically in keeping with the spirit of the invention.

In an alternate embodiment, the computing device 12 may choose robot instructions and parameters of robot instructions based on based on the computing device 12 recognizing a particular process. For example, for a welding path, the computing device 12 may choose a weld command and a weld speed based on the type of weld, type of metal and thickness of material. In another example, for a machining path, the computing device 12 may choose a tool speed based on what tool is being used and the type of material being removed. In another alternate embodiment, changes to the parameters of the robot instructions may be indicated by projecting different colors and/or shapes on the workpiece 15. For example, without limitation, when the tool speed increases, the projected poses and/or path lines may use a red color to indicate the increase or a blue color could be used to indicate a slower speed. In another example, different colors and/or shapes would be used to indicate that the robot motion is near a joint limit or a singularity.

Figure 7B:
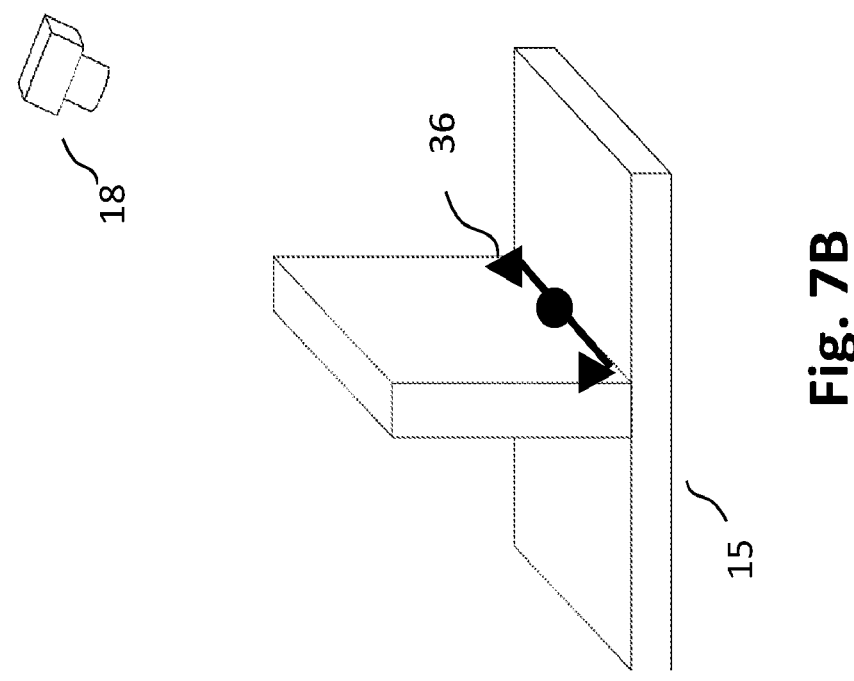
FIGS. 7A-7B show a sample workpiece on which images of various geometries and of robot-program information are projected by the projecting device.
Figure 7A:
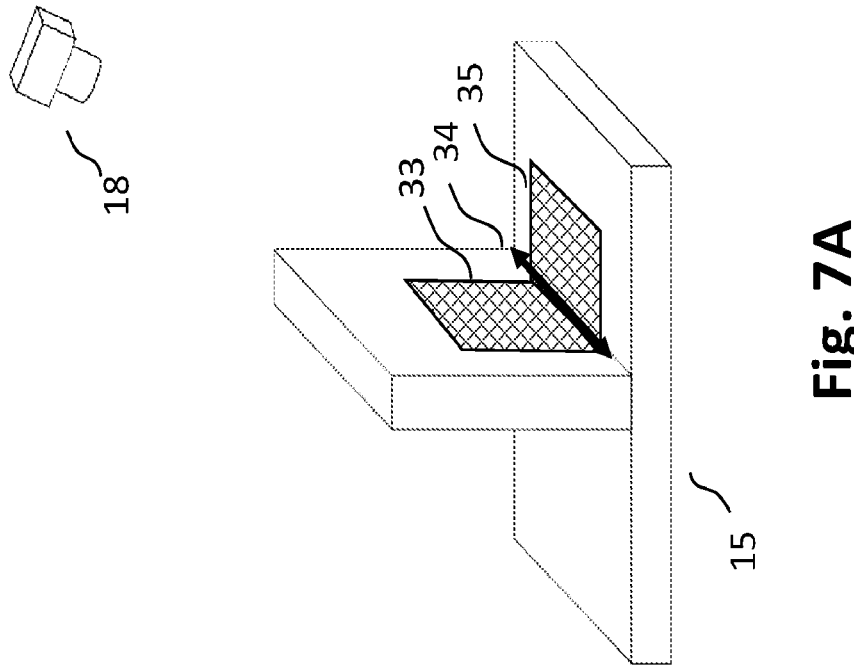

FIGS. 7A-7B show a simple workpiece 15 to be operated on by the industrial robot 14 and images projected on the workpiece 15 by the projecting device 18. In FIG. 7A, images of three geometries are projected on the workpiece 15 by the projecting device 18. As mentioned elsewhere in the description of this invention, best fit geometries may be calculated by the computing device 12 based on the 3D information of the workpiece 15. Plane 33 and plane 35 are two example geometries calculated by the computing device 12 and projected by the projecting device 18 on the workpiece 15. Line 34 is another geometry calculated by computing device 12, which is the intersection of plane 33 and 35. The geometries are clipped such that the projection of them is limited to be within the boundaries of the workpiece 15. Since the 3D information of the workpiece 15 is known through the means described elsewhere herein, the clipping can be done by limiting projections to the 3D space of the workpiece 15. As the user 17 moves the process-agnostic pointing device 16 near different areas of the workpiece 15, the computing device 12 selects the closest geometry or geometries to project on the workpiece 15. The projection of these geometries enables the user 17 to understand how the poses that the user 17 selects are understood by the robot teaching system 10. In an alternative embodiment, the projecting device 18 shows the potential pose that would be recorded in real time as the user 17 moves the process-agnostic pointing device 16. Optionally, the projected potential pose would have a different color and/or shape than recorded poses so that the user 17 would be able to distinguish between the potential pose and the recorded poses. In FIG. 7B, images showing robot-program information are projected on the workpiece. Annotated line 36 shows the line indicative of the robot motion and three shapes along the line indicating different types of points, including indicating where the welding (or other process) will start via a downward pointing triangle, where the welding (or other process) will stop via an upward pointing triangle, and a via point indicated by a circle. Other images and/or colors may be projected to indicate other robot-program information such as speed, zone, setting digital signals, and so forth.

In an alternative embodiment, images projected by the projecting device 18 may indicate various zone information to the user 17, such as, without limitation, areas that are reachable by the robot 14, areas that are not reachable by the robot 14, areas that are within a predefined safe zone, and so forth. Different colors may indicate the different types of zones, such as green for areas that are reachable and safe, yellow for reachable but not in the safe zone, and red for areas that are unreachable.

In an alternative embodiment, the user 17 may move the process-agnostic pointing device 16 to projected images of an annotated line 36 on the workpiece 15. The user 17 may then select a projected image on the annotated line 36 by aligning the tip of the process-agnostic pointing device 16 on a shape, such as, but not limited to, a shape indicative of a start point, a stop point, or one or more via points along the annotated line 36. After selecting one of these shapes, the user 17 may choose a new pose for the selected point represented by that shape by moving the process-agnostic pointing device 16 to the new pose and pressing a button on the process-agnostic pointing device 16, or by an equivalent means. By performing this process one or more times, the user 17 may edit or modify a previously taught series of poses. Previously taught poses may also be deleted by similarly selecting a previously taught pose using the process-agnostic pointing device 16 but using a different button or equivalent input means to indicate that the point should be deleted instead of modified. Poses are added to a series of one or more poses by similarly selecting a previously taught pose using the process-agnostic pointing device 16 but using a different button or equivalent input means to indicate that the next user-selected pose is to be added instead of modified or deleted. Robot-program information associated with a pose, such as, but not limited to, speed and zone, may be modified by the user 17 by similarly selecting a previously taught pose using the process-agnostic pointing device 16 but using a different button or equivalent input means to indicate a new value for the robot-program information associated with the selected pose. As can be readily appreciated, the projections of geometries, poses, robot motions, zones, and so on described herein may also be made by the projecting device 18 during the teaching process if an alternative to the agnostic pointing device 16 is used such as, but not limited to, jogging, lead through, gestures, or other input means described herein.

Figures 8A, 8B, 8C, 8D:
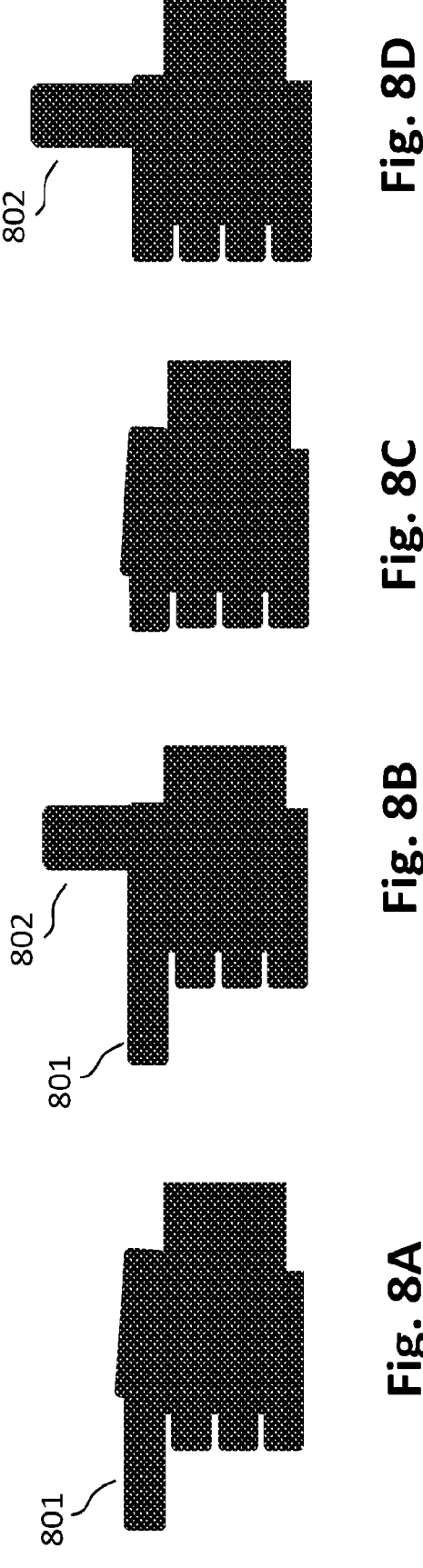
FIGS. 8A-8D show four hand gestures.

FIGS. 8A-8D show four examples of gestures that may be observed by the scanning device 11 during the teaching process described in FIG. 6. These gestures are illustrative, and many additional gestures could be used as inputs into the robot teaching system 10 in keeping with the spirit of the invention. FIG. 8A shows a gesture of a user 17 pointing with his index finger 801. The index finger 801 would be used to point at a potential pose on a workpiece 15. FIG. 8B shows a gesture of the user 17 pointing with his index finger 801 and his thumb 802 being up. The transition from the gesture in FIG. 8A to the gesture in FIG. 8B would be observed by the scanning device 11 and recognized by the computing device 12 as a gesture that indicates the pose being pointed at by the index finger 801 is to be recorded. FIG. 8C shows a gesture of the user 17 with just a first without any fingers or a thumb being extended from the hand. The transition from the gestures in FIG. 8A or 8B to the gesture in FIG. 8C would be observed by the scanning device 11 and recognized by the computing device 12 as a gesture for indicating that no more poses are to be recorded for the current robotic procedure.

FIG. 8D shows a gesture of the user 17 with his thumb 802 being up and no fingers extended. The transition from other gestures to the gesture in FIG. 8D would be observed by the scanning device 11 and recognized by the computing device 12 as a gesture for indicating that the robot tool being used to perform work on workpiece 15 should be toggled between an on and off state. As mentioned, these gestures are illustrative, and many additional gestures could be used as inputs into the robot teaching system 10 in keeping with the spirit of the invention. Additional gesture combinations may involve extending more fingers and/or different orientations of the hand. These combinations would be used for user 17 to specify other robot commands, such as, without limitation, pausing robot motion or setting an IO value. These combinations would also be used to specify parameter settings for the robot, such as, without limitation, robot speed, type of weld, and zone. These combinations would also be used to indicate when to insert, edit/modify, or delete poses and associated robot-program information.

Figures 9A, 9B, 9C:
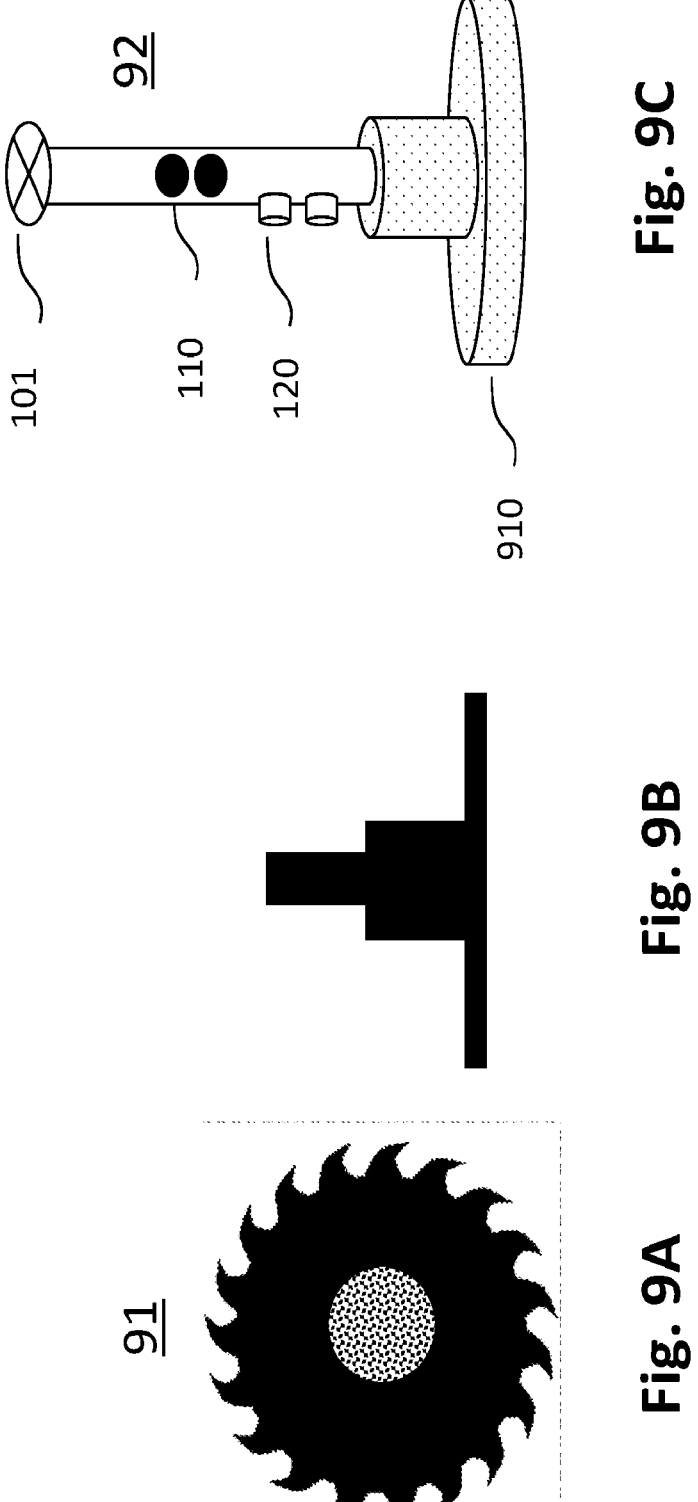
FIGS. 9A-9C show a tool to perform work on a workpiece and a corresponding dummy tool.

FIGS. 9A-9B show an example tool and FIG. 9C shows a corresponding dummy tool. FIG. 9A shows the face of a saw tool 91 and FIG. 9B shows the side view of the same tool. FIG. 9C shows a dummy tool 92 whose diameter of its face 910 corresponds to the diameter of the face of the real saw tool 91 in FIG. 9A. This correspondence between the size and shape of the real tool 91 and the dummy tool 92 enables the user 17 to move the dummy tool 92 in relation to the workpiece 15 and immediately observe how the whole face of the real tool 91 moves in relation to the workpiece 15 when the robot 14 performs work on the workpiece 15. For example, this allows the user 17 to move the dummy tool 92 in such a way that collisions are avoided and saw cuts are located in the right locations. The rest of the dummy tool 92 is largely of the same design as the process-agnostic pointing device 16 in that it may include a fiducial marker 101 that is trackable by the scanning device 11 as described elsewhere herein. The dummy tool 92 may also include LEDs 110 and buttons 120 similar to those described elsewhere herein.

In other embodiments, a dummy tool could represent other tools, such as, without limitation, a welding gun, a paint gun, a gripper, a deburring tool, or a milling tool. These tools are illustrative, and many additional tools could be used in keeping with the spirit of the invention.

In another embodiment, 3D information including but not limited to some or all of the 3D shape of the workpiece 15 and/or some or all of the poses of the instructions for the robot 14 to perform work on the workpiece 15 are known prior to the user 17 using the robot teaching system 10. This prior-known information may come from computer-aided drafting (CAD) model(s), a 3D scan, and/or user input. In this embodiment, key prior-known features of the workpiece 15, such as and without limitation, edges or planes, and/or poses for the instructions for the robot 14 are registered (i.e., mapped) to the coordinate system of the robot 14 and are projected at the intended locations of the workpiece 15 by the projecting device 18 in or near the area where the robot 14 is intended to perform work on the workpiece 15. These projections may be visible to the user 17 to assist the user 17 when selecting poses to be used by the robot teaching system 10 as described elsewhere herein. The projection vectors for the projecting device 18 may be calculated by using ray tracing on the key prior-known features, or similar means known to those skilled in the art, and the vectors for those rays may be registered (i.e., mapped) to the coordinate system of the robot 14 using coordinate transformation techniques known to those skilled in the art. The colors and shapes projected by the projecting device 18 also enable the user 17 to place the workpiece 15, and to continue to modify its placement until the workpiece 15 is fully aligned with the projected colors and shapes.

In an alternative embodiment, the relationships between the location of the robot 14 and: (i) its coordinate system, (ii) the coordinate system of the scanning device 11, and (iii) the location of the projecting device 18 are known using the means described elsewhere herein, or a similar means. The scanning device 11 may then be used to scan the workpiece 15, and then the computing device 12 may use the scanned information and registration means known to those skilled in the art to calculate a difference between the projected intended location. This difference is used to create a transformation to modify the prior-known 3D shape of the workpiece 15 and/or the prior-known poses of the instructions for the robot 14 so that that the 3D shape of the workpiece 15 and/or the prior-known poses of the instructions for the robot 14 are aligned with the actual location of the workpiece 15 based on the placement by the user 17. In a further alternate embodiment, after the alignment between the prior-known poses of the instruction for the robot 14 are aligned with the actual location of workpiece 15, the user may use pose and instruction teaching means described elsewhere herein to add, edit/modify, or delete robot-program information such as, but not limited to, poses and/or instructions corresponding to workpiece 15.

In an alternative embodiment, some or all of the 3D information of the workpiece 15 and some or all of the poses of the instructions for the robot 14 (based on the 3D information) to perform work on the workpiece 15 are known to the robot teaching system 10 because they have been taught using the robot teaching system 10 as described elsewhere herein, or the poses of the instructions for the robot 14 were known to the robot teaching system 10 prior to using the robot teaching system 10. In this embodiment, the user 17 places the workpiece 15 at or near the intended location for the robot 14 to perform work on the workpiece 15. Then the workpiece 15 is scanned by the scanning device 11 as described elsewhere herein. Based on the scanned information of the workpiece 15, poses for the instructions for the robot 14 may be projected at the intended locations of the workpiece 15 by the projecting device 18. The colors and/or shapes projected by the projecting device 18 may show what instructions can be performed by the robot 14, if any, or what instructions cannot be performed by the robot 14, if any, based on the current location of the workpiece 15 and what is reachable by the robot 14. For example, without limitation, green circles may be used when projecting reachable instructions, and red crosses may be used when projecting unreachable instructions. The user 17 may use the projected information and may decide whether to execute instructions that can be performed by the robot 14 (i.e., the set of reachable instructions) or decide to place the workpiece 15 in a new location and redo the scan and evaluation process. In such a way, the user 17 may refine the location of the workpiece 15 in order to perform programs such as, without limitation, welding, painting or dispensing, either with a single accurate placement of the workpiece 15 or by iteratively placing the workpiece 15, then performing some work, and then placing the workpiece 15 in a new location and performing more work. A user interface also provides a means for the user 17 to manually select which instructions to include or exclude when the robot 14 performs its work on the workpiece 15.

In like manner, in a further alternative embodiment, the aforementioned scan of the workpiece 15 may be performed just prior to performing work on the workpiece 15 (i.e., a new scan) and compared with previously known 3D information of the workpiece 15 (either from an earlier 3D scan, from CAD, or from some other means). The robot teaching system 10 may compare the new scan with the previously known 3D information described elsewhere herein (e.g., using 3D registration techniques known to those skilled in the art). If the comparison results in large differences (for example and without limitation, exceeding a predefined transformation distance limit, exceeding a predefined reorientation limit, or exceeding a predefined limit of the sum of distances of all nearest neighbors), the robot teaching system 10 may be configured to use the aforementioned comparison (e.g., 3D registration techniques) to modify the robot-instruction poses to match the changes detected by the comparison or perform yet another even more detailed 3D scan and modify the robot-instruction poses to match the changes detected by using the even more detailed 3D scan. Alternatively, the more detailed 3D scan can be performed using a mix of sensors, such as, but not limited to, 3D vision or laser scanners.

Figure 10:
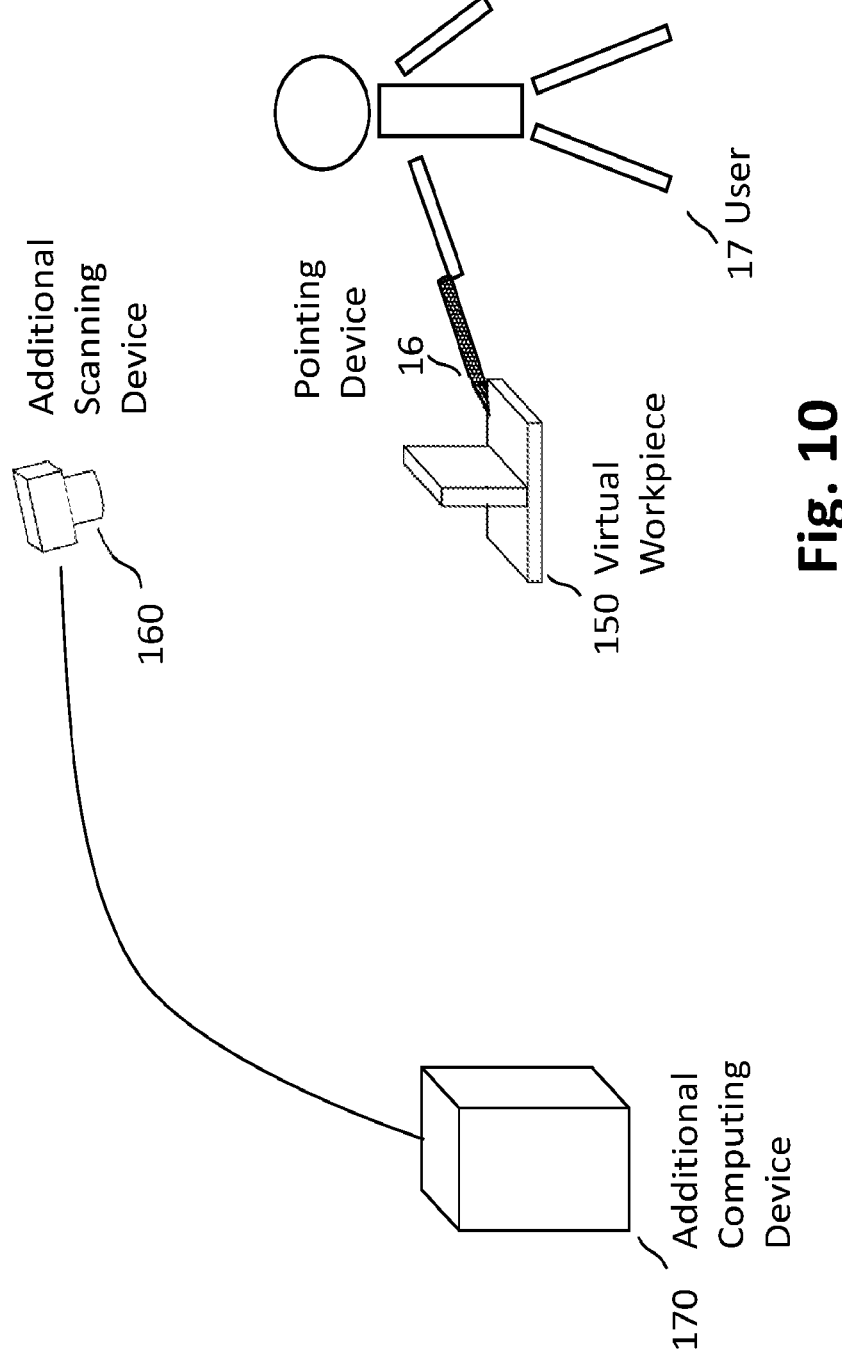
FIG. 10 shows a graphical representation of an embodiment for a robot teaching system that uses a virtual workpiece during the teaching process.

FIG. 10 shows an alternative embodiment of the robot teaching system 10. The workpiece 15 (not shown) may be scanned by a scanning device 11 (not shown) as described elsewhere herein, and the 3D scan may be used to display a corresponding virtual workpiece 150 to the user 17 using various means, such as, without limitation, virtual reality, augmented reality, or a hologram. This virtual workpiece 150 may be displayed to the user 17 in any location, such as, without limitation, a different work cell than the physical robot 14, at a desk in an office environment, or at the home of the user 17. This location could be local or remote in relationship to the location of the real robot 14. This location has an additional scanning device 160 and additional computing device 170 with similar capabilities to the scanning device 11 and computing device 12 described elsewhere herein. When the virtual workpiece 150 is displayed to the user 17, the user 17 may teach poses, associated robot-program parameters, and/or robot-program states in the same way described elsewhere herein, by using a process-agnostic pointing device 16, gestures, or a dummy tool 92 (not shown) with the exceptions that the additional scanning device 160 is may be used instead of the scanning device 11 and that the additional computing device 170 may be used instead of the computing device 12. Since the virtual workpiece 150 may have the same size and shape as the real workpiece 15, what is taught by the user 17 based on the virtual workpiece 150 may be used by the additional computing device 170 or the computing device 12 to generate robot-motion instructions and/or other robot instructions as described elsewhere herein. In an alternative embodiment, the 3D data for the virtual workpiece 150 may be based on a CAD model instead of a 3D scan.

Figure 11:
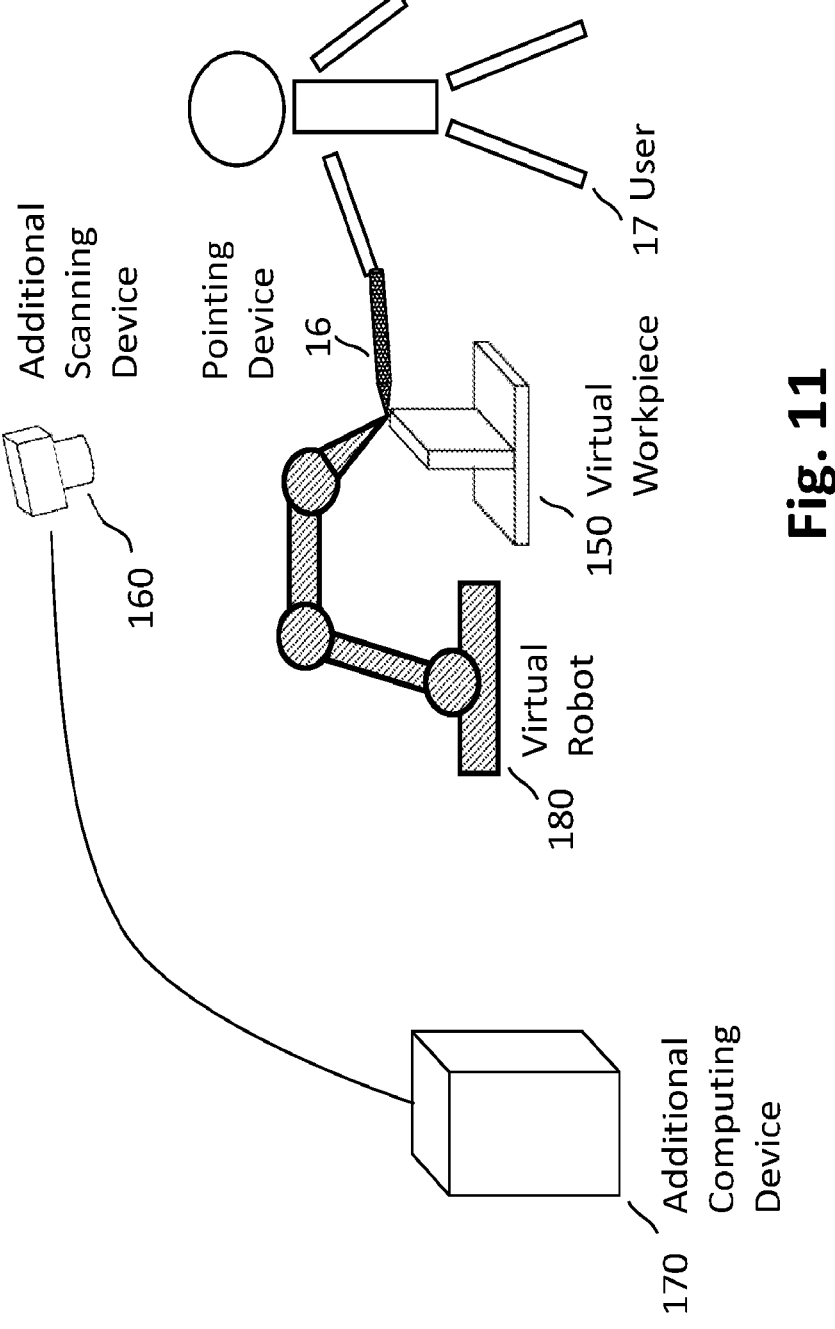
FIG. 11 shows a graphical representation of an embodiment for a robot teaching system that uses a virtual workpiece and a virtual robot during the teaching process.

FIG. 11 shows an alternative embodiment of the robot teaching system 10 comprising with a virtual robot 180, or a portion of a virtual robot 180, such as, without limitation, a tool portion and/or the last few joints of the robot, that may be displayed to the user 17 using various means, such as, without limitation, CAD simulation, virtual reality, augmented reality, or a hologram. The virtual robot 180 or portions thereof may be displayed to the user 17 while the user 17 teaches poses, associated robot-program parameters, and/or robot-program states in the same way described elsewhere herein, by using a process-agnostic pointing device 16, gestures, or a dummy tool 92. The location and pose of the virtual robot 180 or portions thereof may be calculated by the computing device 12 or additional computing device 170 to match the corresponding robot-motion instruction for the pose being taught by the user 17 by using a process-agnostic pointing device 16, gestures, or a dummy tool 92. The pose of the virtual robot 180 may match the current pose being taught by the user 17, such as the location of a process-agnostic pointing device 16, gesture, or a dummy tool. In an alternative embodiment, the pose of the virtual robot 180 may match the closest point on a geometric shape on the virtual workpiece 150 and the current pose being taught by the user 17. For example, without limitation, the pose of the virtual robot 180 may be the pose on a plane on the virtual workpiece 150 that is closest to the current pose being taught by the user 17.

Displaying the virtual robot 180 or portions thereof as described above may provide immediate feedback to the user 17 to enable the user 17 to understand and fine tune the poses he may be teaching. Additionally, the user 17 may adjust the intended joint configuration for the robot-motion instruction based on observing the virtual robot 180 configuration and by providing user inputs using the process-agnostic pointing device 16, by adjusting gestures of the user 17, or by providing user inputs using a dummy tool. In an alternative embodiment, the virtual robot 170 or portions thereof may move along a series of poses based on information taught by the user 17 to enable the user 17 to see the potential motion of the robot 14 for more than one instruction in sequence. Additional information, such as, without limitation, robot reachability, proximity to a singularity, being inside or outside a safety zone, and so on may be shown using colors or symbols on the virtual robot 180. This enables the user to know when some poses are more or less valid and/or desirable for the program being taught, and thereby to determine if/when to change the poses using means described elsewhere herein.

In an alternative embodiment, as the virtual robot 180 or portions thereof are moved to one or more poses based on poses taught by the user 17, associated equipment and/or process changes may be simulated and displayed virtually to the user 17 using, without limitation, CAD simulation, virtual reality, augmented reality, or a hologram. Such simulation may be accomplished by any suitable physics simulation engine. The associated equipment may include, without limitation, cabling, sensors, cameras, lighting, an so on. Further, simulation and display of the equipment may include simulating and displaying various states of the equipment, for example the opened and closed states of a gripping tool. The process changes may include, without limitation, color changes due to painting or a picked part in a gripping tool.

In an alternative embodiment, the workpiece 15 may be scanned as described elsewhere herein, then robot instructions may be created by recording poses input by the user 17 as described elsewhere herein, and then the robot instructions may be imported into any number of CAD-based robot programming tools by using importing and/or format-conversing means known to those skilled in the art. The robot instructions may then be simulated in, without limitation, the CAD tool, augmented reality or virtual reality, then tuned, and then later run on a real robot 14. Optionally, the tuning may be performed in CAD and/or by recording and editing poses input by the user 17 as described elsewhere herein, such as editing poses on the real workpiece 15, editing poses by augmented reality, or other means described in this invention. Optionally, the 3D information of the workpiece 15 itself created during the scan may also be imported into the CAD-based robot programming tool. Optionally, when prior 3D CAD information exists, the scanned 3D information may be registered to the prior 3D CAD information using registration means known to those skilled in the art.

FIGS. 12A-12D, how an ideal workpiece 1202 and a real workpiece 1212 that corresponds to the ideal workpiece 1202 but has differences from the ideal workpiece 1202. The 3D information about the ideal workpiece 1202 may be known ahead of time or may be generated by scanning the ideal workpiece 1202 using the scanning means described elsewhere herein. Robot instructions may be created for work to be done on the ideal workpiece 1202 either ahead of time or by teaching means described elsewhere herein.

Example sources of differences between the two workpieces 1202 and 1212 are, without limitation, lengths and/or shapes of some of the geometric components of the two workpieces 1202 and 1212. For example, intersection 1204 on the ideal workpiece 1202 is straight and of a known length, while the corresponding intersection 1214 on the real workpiece 1212 may be curvilinear and of an unknown length.

After performing a 3D scan of the real workpiece 1212 as described elsewhere herein, the 3D representations of the two workpieces 1202 and 1212 may be compared. For example, a comparison may be made by registering the 3D representations of the two workpieces 1202 and 1212 by registration means known by those skilled in the art. This overall registration defines the transformation that also enables the intersection 1214 to be approximately aligned with intersection 1204, and likewise intersection 1216 can be aligned with intersection 1206. After this alignment, the ideal intersection 1204 may be compared with the real intersection 1214 in terms of length, shape, and other attributes. A new robot program may be generated by the computing device 12 for the real workpiece 1212 based on the program that exists for the ideal workpiece 1202. This program generation may be done by, for example, without limitation, offsetting the program based on the transformation information generated during the registration procedure described above and/or scaling the distance between points in the program based on the different lengths of intersection 1204 and intersection 1214. In cases where the real workpiece 1212 has a slightly different shape than the ideal workpiece 1202, due to warping or other causes, the program generation for the real workpiece 1212 also includes adding and adjusting robot-motion instructions by projecting poses from the robot program intended for the ideal intersection 1204 for ideal workpiece 1202 onto the shape defined by the real intersection 1214 for the real workpiece 1212. The same process may be repeated for all corresponding intersections that have robot instructions for the real workpiece, such as for ideal intersection 1206 which corresponds to real intersection 1216.

Figures 12A, 12B:
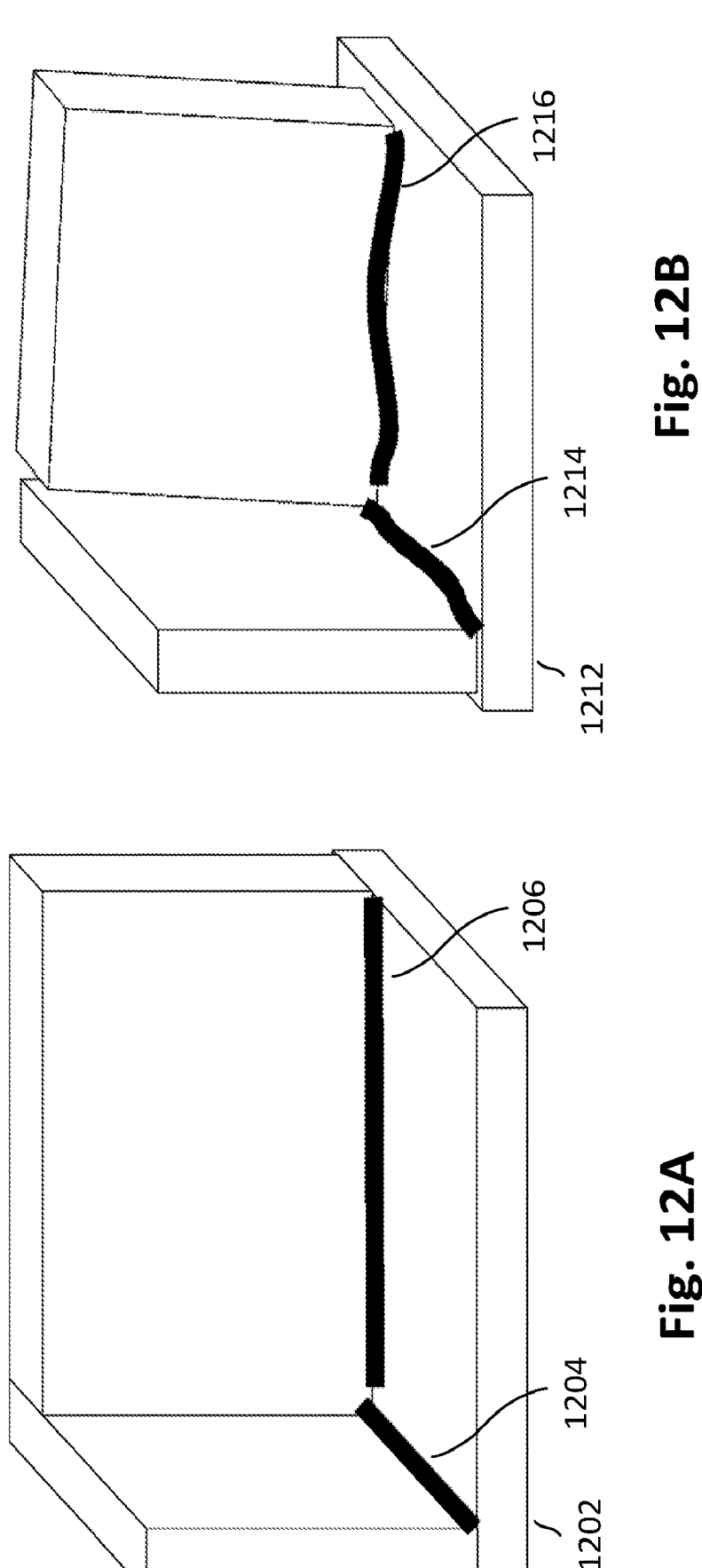
FIGS. 12A-12D show an ideal workpiece and a real workpiece that corresponds to the ideal workpiece but has differences from the ideal workpiece.
Figure 12C:
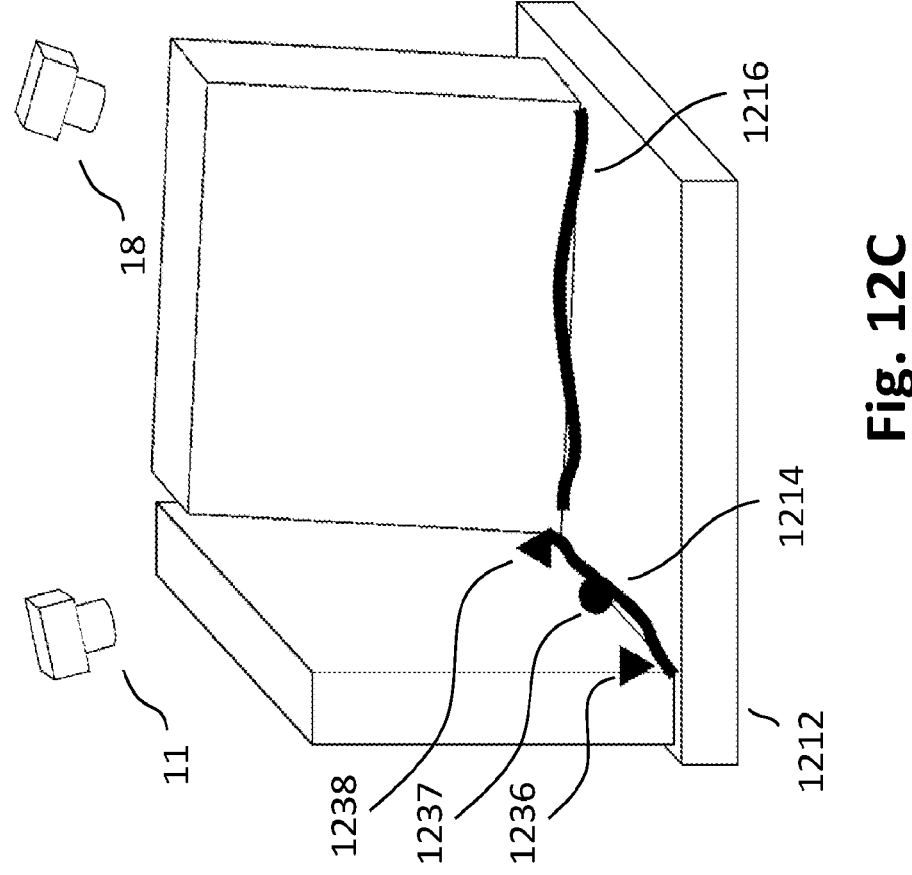

Optionally, the same projection means described elsewhere herein may be used to project expected locations of the ideal intersections, such as intersection 1204 and 1206, and/or project the scanned location of the actual intersection, such as intersections 1214 and 1216. As shown in FIG. 12C, the projecting device 18 projects the intersections 1214 and 1216 on the real workpiece 1212 based on the scan made by scanning device 11. Additionally, robot-program information generated by the computing device 12 may be projected on the real workpiece 1212. The projection may include poses, such as poses to start a robot process, stop a robot process, and a via pose between the start and stop poses. In FIG. 12C, the start pose 1236, via pose 1237, and stop pose 1238 are indicated by a downward pointing triangle, circle and upward pointing triangle, respectively. As can be appreciated, other shapes and/or colors may be used to indicate other robot-program information such as speed, zone, other poses, and so forth.

Figure 12D:
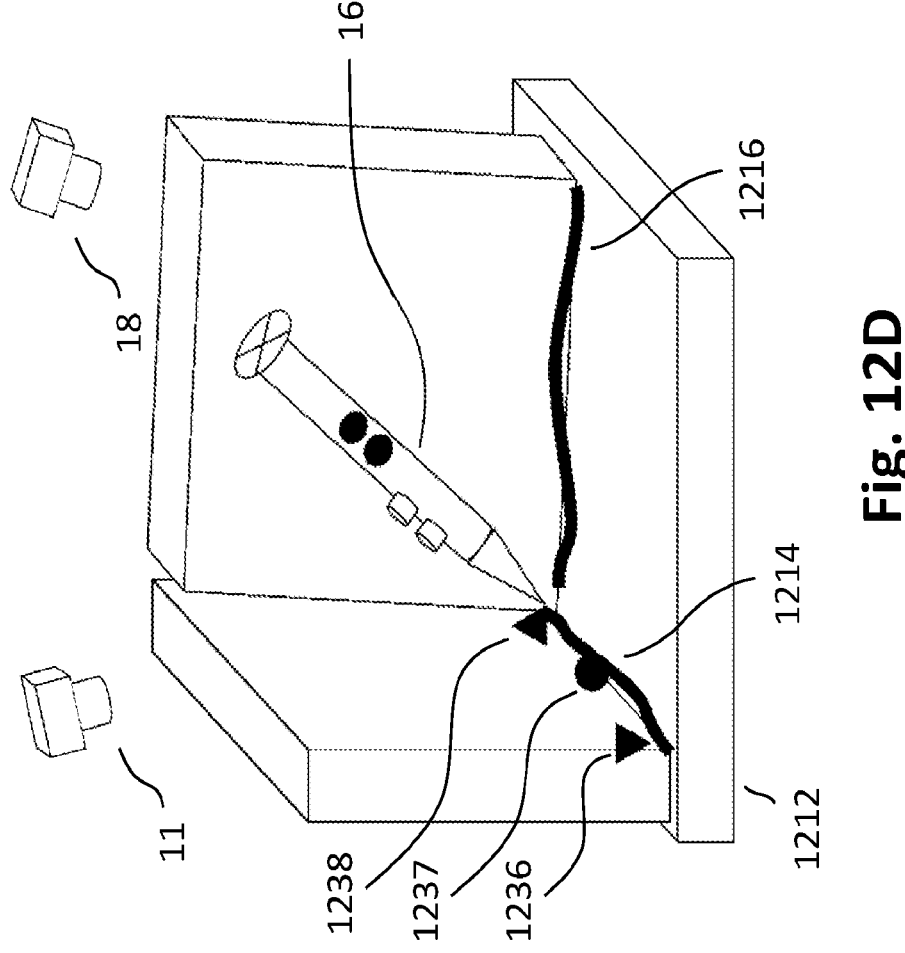

Optionally, the various user input means described elsewhere herein may be used by the user 17 to manually add, delete, or edit/modify the robot-program information generated by the computing device 12 described above. As shown in FIG. 12D, a process-agnostic pointing device 16 may be used to edit robot-program information. The robot-program information to edit may be selected by the user 17 moving the pointing device 16 to one of the poses, for example pose 1236, and pressing one of the buttons 120 on the pointing device 16. After selecting one of the poses, the user 17 may use the buttons 120 to indicate if the pose itself or the robot-program information associated with that pose (for example, but not limited to, speed, zone, or other process information) is to be edited/modified, deleted, or added to. When editing/modifying the pose, the user 17 may move the pointing device 16 to another location and may use the buttons 120 to confirm selection of the new position. Once confirmed in this manner, the robot teaching system 10 may move the previous location of the pose to the new location. Adding or inserting poses may be done in like manner, with the user 17 moving the pointing device 16 to the location of the new pose to add or insert and using the buttons 120 to confirm the addition or insertion. Editing robot-program information may be done by using the buttons 120 and/or an additional user interfaces known to those skilled in the art to select speed, zone, or any other related robot-program information values. Note that as poses and associated information are changed in these ways, the new/updated sequence of poses may be re-analyzed in order to adjust the positions and/or orientations of the robot-motion instructions as described elsewhere herein. For example and without limitation, the trajectory between two poses may be recalculated based on the changes just described for every sequence of two poses selected through the process and a predefined, user-defined or heuristics-based lead or lag angle may be calculated for the robot-motion instructions based on the trajectories calculated for every sequence of poses.

As can be readily appreciated, geometric information about the workpiece 15 may also be edited using the pointing device 16 in a like manner, such that, for example and without limitation, poses that define a plane, cylinder, or edge may be edited, added to, or deleted so as to improve the quality of the geometric information (i.e., geometries or geometric features). An example of adding to a pose with the pointing device 16 may include using the pointing device 16 to collect more points to define a geometry like a plane or a cylinder, which may increase the accuracy of such geometry. This may be done by the robot teaching system 10 projecting poses that define a geometry or geometric feature and the user 17 utilizing the same means described above to edit/modify, delete, or add poses. As can also be readily appreciated, the process just described for editing, deleting, and adding poses, robot-program information, and geometric information may be performed in like manner with gestures, jogging, lead through, augmented reality and CAD-based input means as described elsewhere herein.

As can be readily appreciated, the same procedure described above for comparing intersections and generating programs based on the comparison of the intersections may be used to compare edges, surfaces, and other shapes, and then to generate the corresponding robot programs for those edges, surfaces, and other shapes.

Figure 13B:
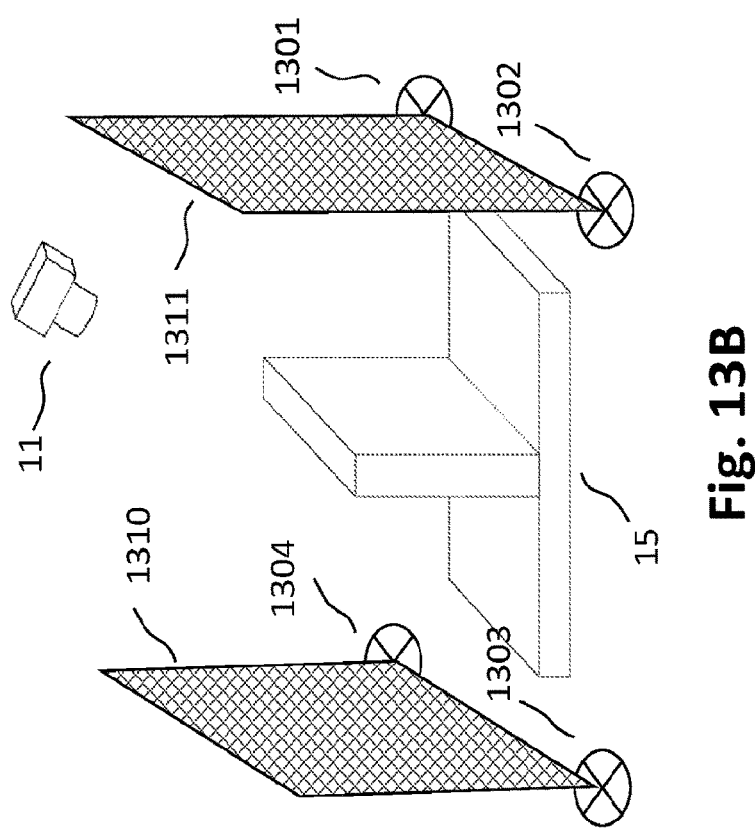
FIGS. 13A-13F show a workpiece, a scanning device, fiducials around the workpiece, virtual markers, bounding geometries, and scan paths created from the fiducials, virtual markers, and bounding boxes.
Figure 13A:
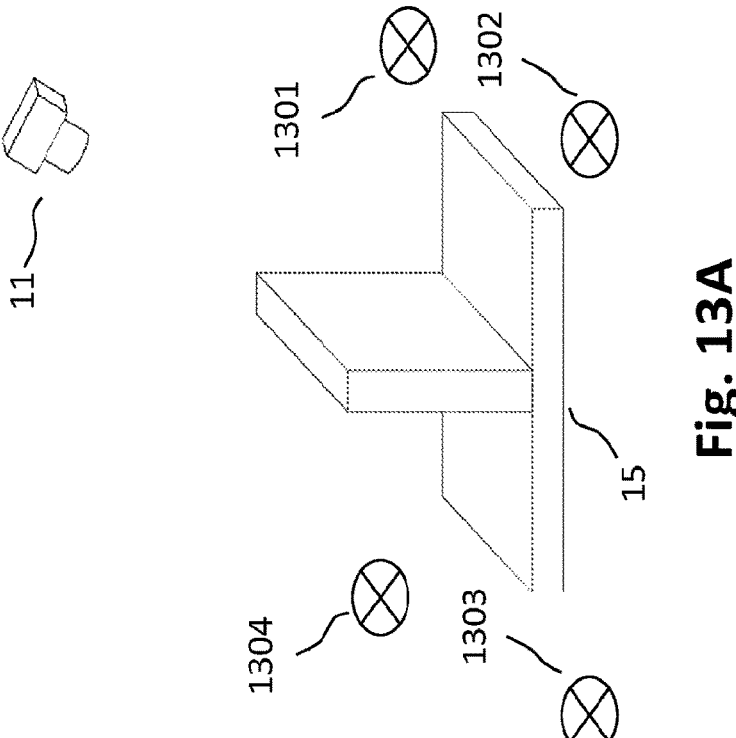

FIGS. 13A-13F show alternative embodiments comprising a workpiece 15 and a scanning device 11. These figures and the following description show how the region of a detailed 3D scan of the workpiece 15 may be limited to a specified volume. In FIGS. 13A-13B, fiducials 1301, 1302, 1303, and 1304 are shown. In this embodiment, the scanning device 11 scans the workpiece 15 as described elsewhere herein with the exception that the scanning procedure only includes the information included within the area defined by the fiducials 1301, 1302, 1303, and 1304. These fiducials are treated as bounding locations, and the scanning process may be optimized because additional 3D information outside the bounds of the area defined by the fiducials 1301, 1302, 1303, and 1304 is excluded. The bounds of the area defined by the fiducials 1301, 1302, 1303, and 1304 may be defined according to rules. Such rules may be, for example and without limitation, bounding the scan areas using planes created by drawing a line between two fiducials and extending a plane that is orthogonal to the best fit plane of all fiducials. Creating such planes using lines and best fit planes is well known to those skilled in the art. FIG. 13B shows two such planes: plane 1310 that is created from the pair of fiducials 1303 and 1304, and plane 1311 that is created from the pair of fiducials 1301 and 1302. As can be appreciated, planes 1310 and 1311 are representative, and additional planes may be created in a similar fashion between fiducials 1304 and 1301 and also between fiducials 1303 and 1302. Thus, a workpiece can be bounded by three or more fiducials. In some embodiments, at least three fiducials are required, and more than four fiducials may be used, such that bounding planes may be created with respect to any pair of adjacent fiducials.

As can be appreciated, other bounding rules and shapes may be applied, such as, without limitation, extending the planes by a fixed distance known in advance or by using a value provided by the user, or by using the fiducials to define other shapes, such as cylinders or spheres of specific sizes. Alternatively, straight lines or other shapes may be used to define bounds instead of defining the shapes using fiducials. As can also be appreciated, objects other than fiducials may be used in keeping with the spirit of the invention, such as, but not limited to, specific 2D or 3D markings or shapes that may be recognized by a scanning device 11.

Figure 13D:
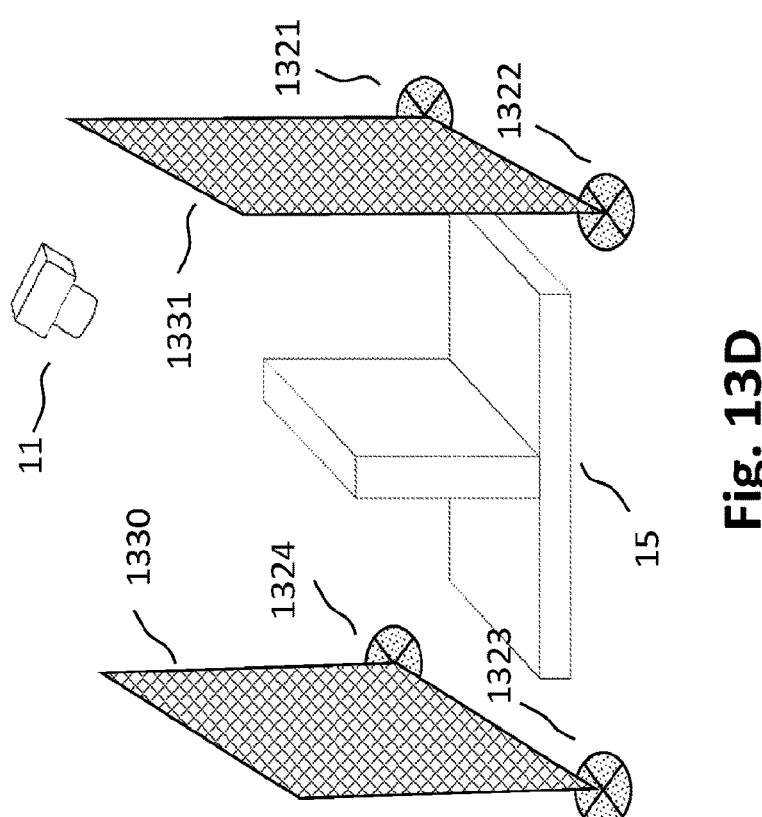
Figure 13C:
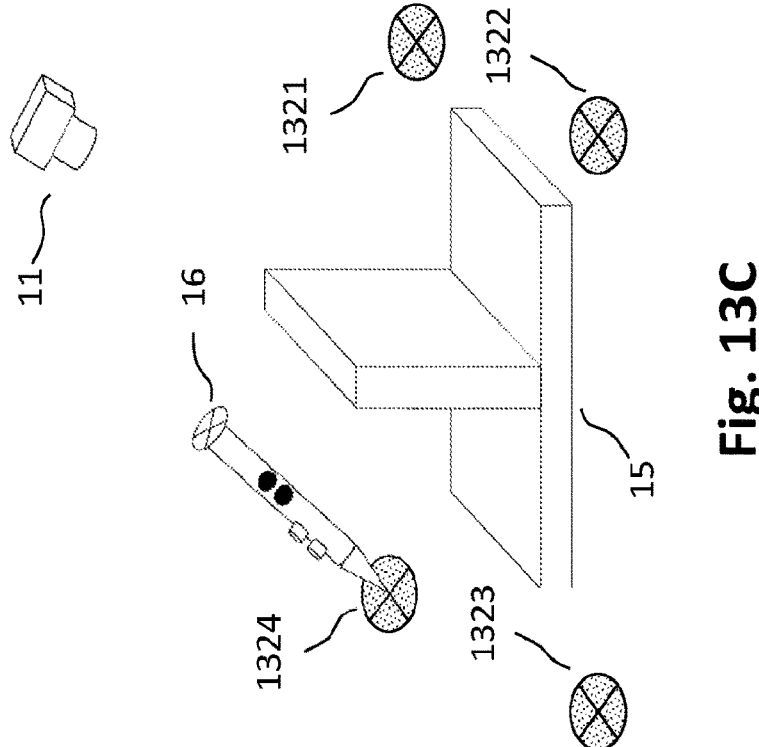

FIGS. 13C-13D show another alternative embodiment, where instead of fiducials, the user 17 may define the bounds of the area to include in the scan by specifying bounding locations 1321, 1322, 1323, and 1324 using the process-agnostic pointing device 16. The process-agnostic pointing device 16 may teach bounding locations 1321, 1322, 1323, and 1324 using the same means of specifying poses with the process-agnostic pointing device 16 as described elsewhere herein. The bounding locations may be used to define the bounds of an area in the same manner fiducials were used to define the bounds of an area as described with respect to FIGS. 13A-13B. In like manner, bounding locations 1324 and 1323 are used to define plane 1330, and similarly bounding locations 1321 and 1322 are used to define plane 1331. As can be appreciated planes 1330 and 1331 are representative, and additional planes may be created in a similar fashion between bounding locations 1324 and 1321 and also between bounding locations 1323 and 1322. Thus, a workpiece can be bounded by three or more bounding locations taught using the process-agnostic pointing device 16.

As can be appreciated, the three or more bounding locations may also be taught by other input means mentioned herein, including but not limited to, jogging, lead through, and gestures. As can also be appreciated, other bounding rules and shapes may be applied, such as, without limitation, extending the planes by a fixed distance known in advance or by using a value provided by the user 17, or by using fiducials to define other shapes, such as cylinders or spheres of specific sizes.

As can also be appreciated, the user 17 may define bounding locations using an offline tool such that bounding locations may be defined by manually-entered values or by defining locations using CAD, a similar type of software, or a combination of any of the bound-defining methods described above. In an alternative embodiment, the bounding locations may be defined automatically by comparing a 3D scan of a workspace of the robot 14 when the workpiece 15 is not present and a 3D scan of the same workspace when the workpiece 15 is present to identify the location and maximum height, length, and width of the workpiece 15 using techniques known to those skilled in the art. In this embodiment, the 3D scan to define the bounding locations may be a rougher and less complete 3D scan than the later more detailed 3D scan that is made after the bounding locations are determined. Optionally, the bounding locations may use predefined sizes or percentages to extend the bounding locations by a predefined amount.

Figure 13E:
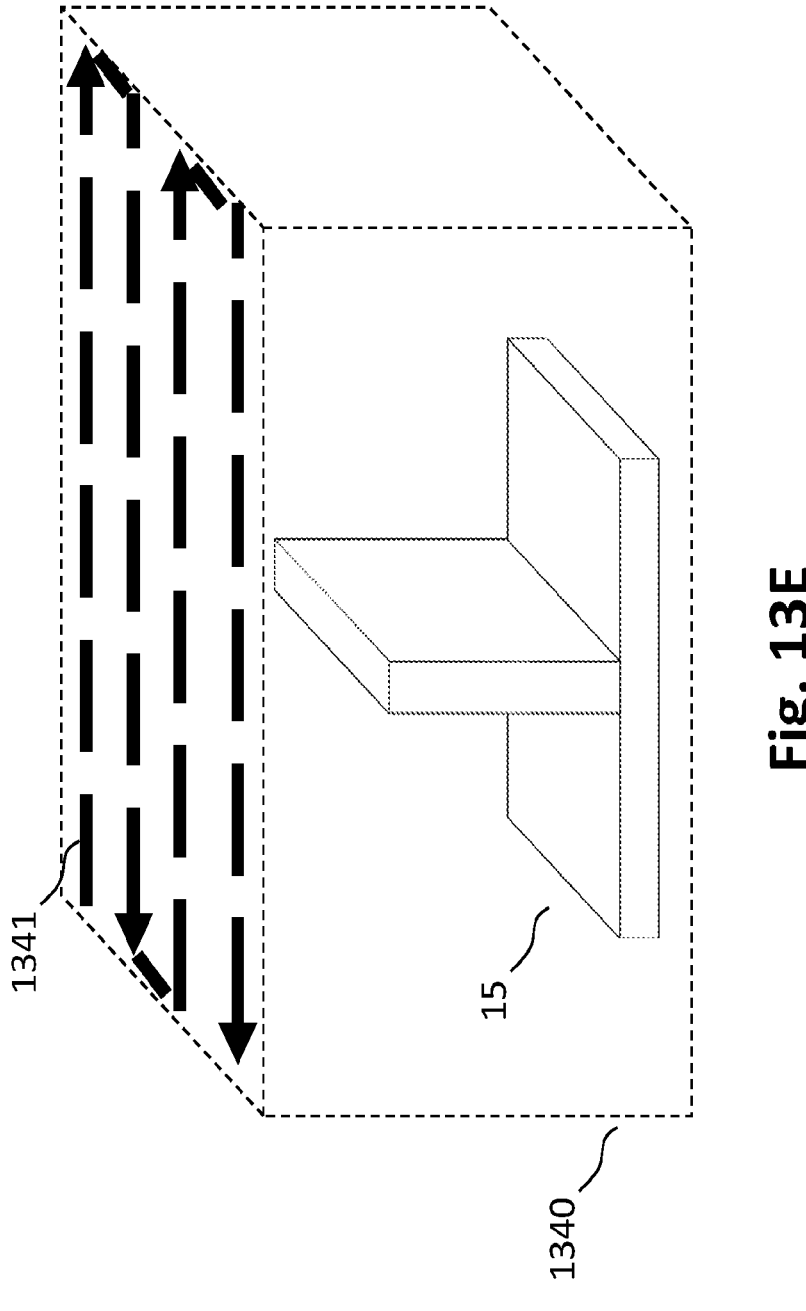
Figure 13F:
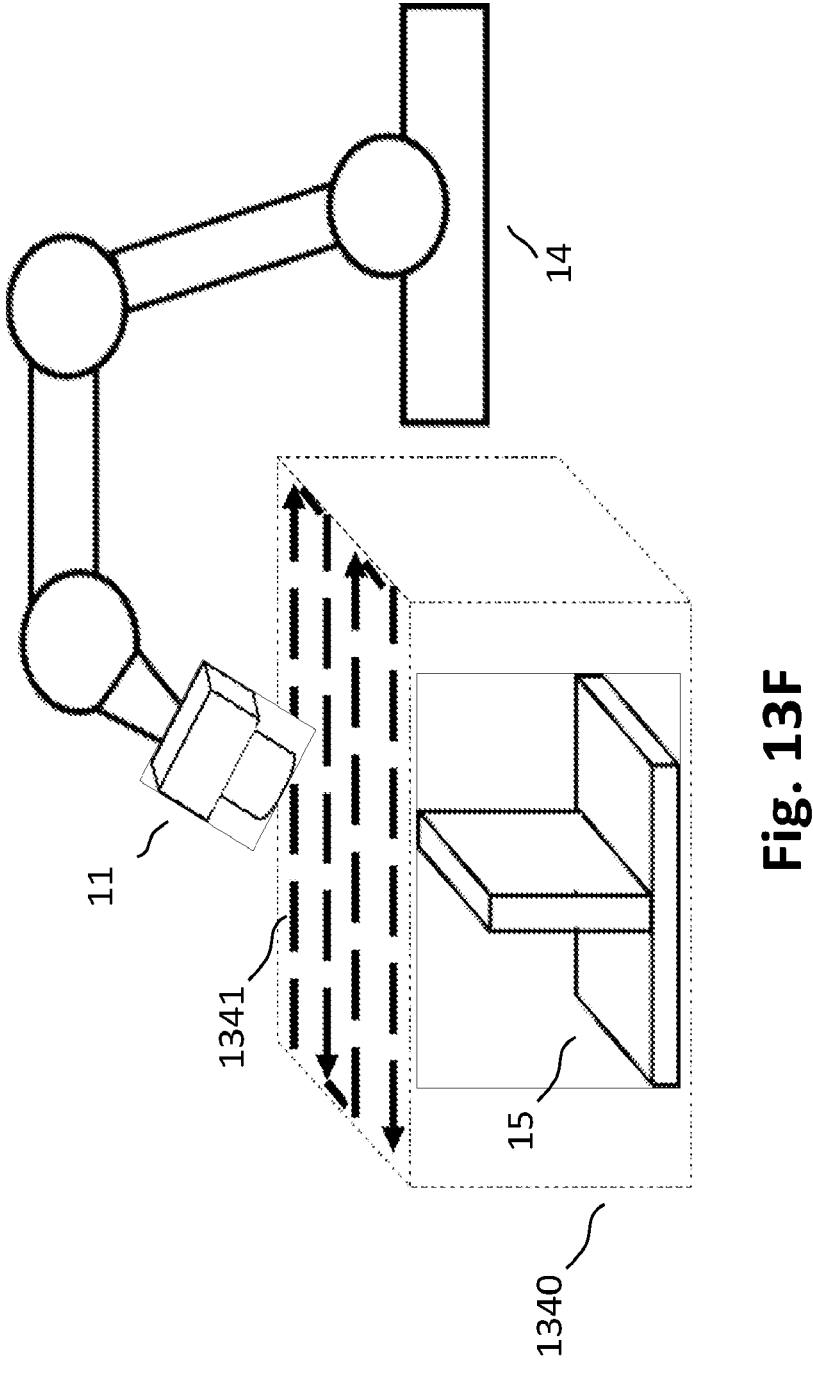

In FIG. 13E-13F, an alternative embodiment is shown that utilizes bounding locations and that uses the robot 14 to perform the 3D scan of the workpiece 15. A 3D scan path to generate the 3D representation of the workpiece 15 may be generated based on the bounding locations. A bounding box 1340 may be generated from the location and max height, length, and width of the bounding locations generated through one of the means already described herein. A scan path 1341 for the robot 14 may be generated by dividing the top of the bounding box 1340 in a predefined or user-defined number of passes. As shown in FIG. 13F, the robot 14 carries scanning device 11, which scans the workpiece 15 as the robot 14 traverses the scan path 1341. The scanning device 11 may scan at one or more stationary positions of the robot 14 along the scan path 1341, or the scanning device 11 may scan while the robot is in motion along the scan path 1341. The scan path 1341 comprises poses that cover the locations on the top of bounding box 1340 and orientations such that the scanning device 11 is aimed towards the bottom center of the bounding box throughout the scanning motion. As can be appreciated, the scan path 1341 may be made with various shapes (e.g., performing a spiral pattern over the surface of a bounding hemisphere, etc.), various densities, and so on, in keeping with the spirit of the invention, and the scan-path types may either be selected by the user 17, and/or the scan-path type and/or some or all scan-path parameters may be selected automatically based on the process type or other factors.

Figure 14C:
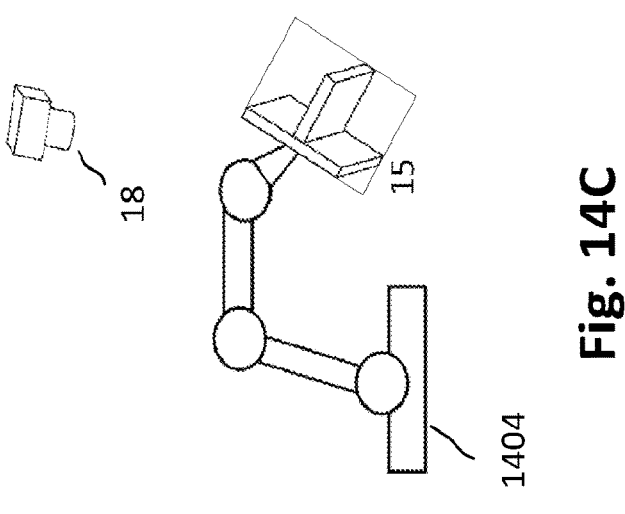
FIGS. 14A-14C show different arrangements of one or more projecting devices.
Figure 14B:
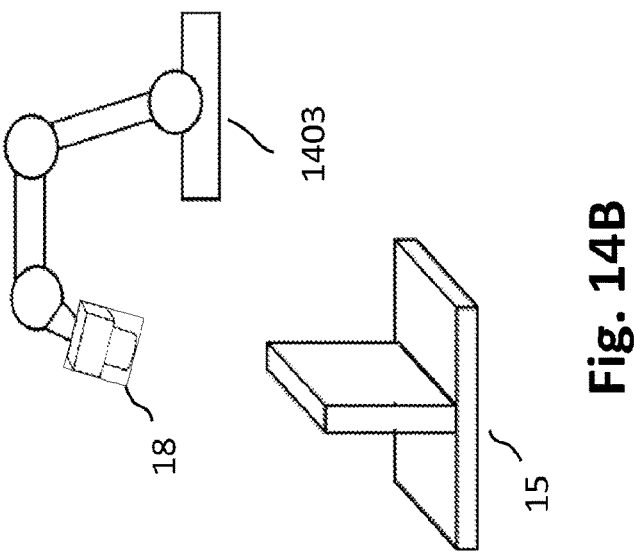
Figure 14A:
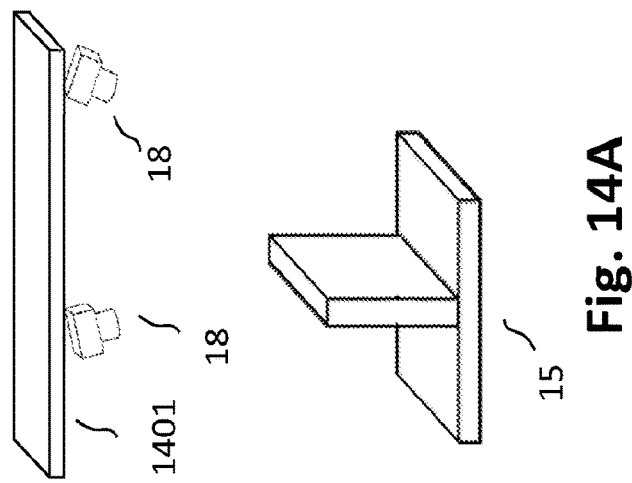

FIGS. 14A-14C show a workpiece 15 and one or more projecting devices 18. In one embodiment shown in FIG. 14A, multiple projecting devices 18 are mounted to a fixed structure 1401. The multiple projecting devices enable projecting images on portions of the workpiece or workspace that may otherwise be occluded from the possible projection area of a single projecting device. In this embodiment, a 3D model of the workpiece and the locations of the projecting devices may be used by the computing device 12 to calculate the projection area of each projecting device 18. The said calculation may be done by ray tracing or other means known to those skilled in the art. In an alternative embodiment, the projecting devices 18 may be mounted on a device with one or more degrees of freedom and may move in order to project images on portions of the workpiece 15 or the workspace of a robot 14 that would be occluded from the possible projection area of a single fixed projecting device. FIG. 14B shows an alternative embodiment with a projecting device 18 mounted on a robot 1403. In this embodiment, the robot 1403 may be moved in order for the projecting device 18 to be able to project images on an area of the workpiece 15 or the workspace of a robot 14 as desired by the user. 17 The workspace desired by the user may be specified by any number of means, such as but not limited to, the user 17 specifying the desired area on a graphical user interface, the user 17 indicating the desired area by moving the pointing device 16, or by similar means. Note that the robot 1403 may or may not be the same robot 14 that performs work on the workpiece 15. FIG. 14C shows an alternative embodiment with a robot 1404 holding workpiece 15. In this embodiment, one or more projecting devices 18 would project images on the workpiece 15 as the robot 1404 moves the workpiece 15. A 3D model of the workpiece 15, the location of the robot 1404, and the location of the workpiece 15 may be input to the computing device 12 to enable the computing device 12 to calculate how to project images on the workpiece 15 by using ray tracing or similar means known to those skilled in the art.

In one alternative embodiment, labeled data may be collected during the teaching process described elsewhere herein in order to train a machine learning and/or artificial intelligence (AI) model that may be used to make the teach processes more automatic and which may require less input from the user 17 during teaching. The model may improve over time by learning and capturing the associations between the various collected data and information described below, eventually making portions of the teaching process fully automatic. For example, when a workpiece is scanned, there may be an analysis of the many geometries in the workpiece as described elsewhere herein. This geometric analysis may include, for example and without limitation, the overall geometry of the workpiece 15, as well as geometric components of the workpiece 15, such as planes, cylinders, intersections of shapes, or edges of shapes. This list of shapes and their relationships may be stored by the robot teaching system 10 as labeled data. The relationships include, for example and without limitation, distances and angles between the shapes.

After the user teaches a robot program using the methods described elsewhere herein, the shapes and their relationships XXX are relationships the same as associations? XXX may be labeled to distinguish what shapes were used in the robot program and what shapes were not used in the robot program. Additionally, the relationships between the shapes and the corresponding robot-program instructions and robot-program information may be saved as labeled data. This includes, for example and without limitation, the relationship between intersecting shapes, a generated path (such as, without limitation, a welding, painting or deburring path), and, for example and without limitation, positions, orientations, weld parameters, paint parameters, speeds, and zones in the robot program. The aforementioned shape types, sizes, distances, relationships, and so forth, are all examples of geometric information. The robot teaching system 10 may be configurable such that geometric information may be associated with robot-program information when that geometric information is within close proximity to the robot-program information. For example, the geometric information is considered within close proximity of a particular piece of robot-program information if the distance between the geometric information and the pose(s) related to the robot-program information do not exceed a predefined threshold (for example and without limitation 10, 50, or 100 millimeters).

Additionally, the robot teaching system 10 may be configured to acquire, process, and/or store new process-assessment information about quality scores and success and failure data for the taught robot programs. The relationship (s) between the shapes and quality, success, failure, and/or robot-program information may be saved as labeled data by the robot teaching system 10. For example and without limitation, quality can be assessed by examining the results of a taught robot program through the non-destructive analysis of a weld, measuring of paint thickness, or other quality assessment means known by those skilled in the art. Such a quality assessment may, for example, produce a quality range from anywhere from 0 to 100 percent. The results of a taught robot program may be labeled a "success" if a minimum quality percent threshold was reached, and a "failure" if the threshold was not reached.

For other processes, such as an assembly, a success or failure may be determined if all components were assembled with certain time thresholds and force limits were not exceeded, or by other assembly quality measures known to those skilled in the art. As can be appreciated, the geometric information described above may be derived from multiple sources, for example and without limitations, 3D scans and/or CAD based models.

The various labeled data may be gathered for multiple workpieces that are taught by the robot teaching system 10 and used to create robot programs. Then the robot teaching system 10 may use the labeled data to train a machine learning model that makes correlations between the scanned information, user input, quality information, success and failure information, and/or the robot-program information by means known to those skilled in the art. Correlations between scanned information, user input, and robot-program information may be at multiple levels, including correlating paths to the scanned information as a whole as well as correlating paths to the scanned information directly associated to the particular paths, such as the 3D information about the intersecting planes or edges that a path was derived from. Such a model may be, for example and without limitation, a support vector machine (SVM), a decision tree, a random forest, or a neural net. The robot teaching system 10 may then use this model to analyze the geometries of newly scanned workpieces and suggest what geometries may be included and what geometries may be excluded for the robot program of the new workpiece.

The robot teaching system 10 may also use the trained model to suggest path data and poses for the robot program as well as other robot-program information, such as but not limited to speed, zone, weld parameters, paint parameters, deburring tool speed, and so on. For example, a machine learning subsystem would automatically present the five most probable paths that should be included in the robot program out of the one hundred possible candidate paths based on the number of shapes, intersections, and edges of a scanned workpiece 15. When presenting probable paths (and other recommendations), the robot teaching system 10 may be configured to also show different confidence levels for the different paths or recommendations it presents.

In an alternative embodiment, the machine learning subsystem would automatically present a single most probable path (i.e., the path with a highest confidence level) that is recommended to the user 17 by averaging the poses of more than one of the most probable paths, or by other means in keeping with the spirit of the invention. This may reduce the amount of effort expended by a user 17 in defining paths. Additionally, the user 17 may be able to modify the recommended paths as described elsewhere herein, such as adding poses or deleting poses. The user 17 may also be able to modify the recommend paths by changing the recommended start point, via, and/or end point, or to modify the recommended robot-program information such as but not limited to speed, zone, weld parameters, and so on. Also, the user 17 may be able to define paths that were not recommended or to delete paths that were recommended. Thus the user 17 may be able to optionally modify the recommendations from the machine learning subsystem to create a completely defined robot program. The changes to poses, paths, and other robot-program information made by the user may also become labeled data that is fed back into the machine learning model such that the model is further improved through this reinforcement learning input using reinforcement learning techniques that are well known to those trained in the art.

In an alternative embodiment, the machine learning-based recommendation subsystem may be enhanced by limiting the input or output of the model (e.g., recommendations for robot-motion instructions) based on predefined criteria (e.g., user-selected filters, profiles, and/or templates) based on types of geometries, their sizes, and/or their relationships. For example and without limitation, the user 17 may instruct the recommendation subsystem to only include edges, or to only include edges within a certain minimum and maximum size, or to only including intersections of planes, or to ignore all cylinders, etc. Other examples of filters and templates include workpieces of known combinations of geometries, for example and without limitation, a workpiece type that is known to have: one cylinder, two main intersections of planes, and one edge to be welded. In another alternative embodiment, the aforementioned collected labeled data may be extended to include process information, such as but not limited to, weld torch angles, robot speeds, zone, tool cutting speeds, and so on. This labeled process information may be saved in a machine learning model and associated with related workpiece geometric information in the same manner as described above such that the machine learning model may be used to generate recommendations to the user 17 for new workpieces. Then, by combining path recommendations and process parameter recommendations, a recommendation for a complete robot program may be generated after scanning the workpiece 15 and analyzing the workpiece 15 with the machine learning subsystem.

Accuracy of the recommendations may increase over time as more labeled data is collected by the robot teaching system 10. Accuracy of the recommendations may also increase over time as users 17 generate more labeled data by editing or correcting the recommendations by the robot teaching system 10, which in itself, as mentioned already herein, is labeled data fed into the machine learning subsystem for reinforcement learning, using means known to those skilled in the art. Such reinforcement learning techniques may include, for example but not limited to, Q-learning with the objective of minimizing the number of changes required by the user 17 to create a robot program, which includes both the robot-program instructions and the robot-program information, such as but not limited to, speed, zones, process parameters (such as weld data, painting parameters, deburring tool speed), and so on. Further reinforcement learning may be included by collecting process-quality information of the programs the user 17 may create with the robot teaching system 10. The quality information may be associated with robot-program paths and/or workpieces 17 either through manual entry of the quality, or through automatic entry via an automatic quality assessment means (for example and without limitation, by non-destructive analysis of a weld, measuring of paint thickness, or other quality assessment means known by those skilled in the art). Such further reinforcement learning techniques may include, for example but not limited to, Q-learning with the objective of maximizing the highest quality while minimizing the number of changes required by the user 17 to create a robot program, which includes both the robot-program instructions and the robot-program information, such as but not limited to, speed, zones, process parameters (such as weld data, painting parameters, deburring tool speed), and so on. In cases where the user 17 fully accepts the recommendations from the robot teaching system 10 for a particular workpiece 15, the robot teaching system 10 completely automates the teaching process for that workpiece 15.

It is important to note that the examples above have frequently referred to welding examples, but the same approach readily applies to material removal, dispensing, and many other robotic applications while keeping in the spirit of the invention. The geometries, templates, and process parameters would be modified and/or tuned for any such application.

In an alternative embodiment, the scan information of the workpiece 15 described elsewhere herein is combined with the taught paths described elsewhere herein in order to automatically assess and tune the taught poses and/or paths. For example and without limitation, steps 616 to 628 shown in FIG. 6A may include one or more of the following automatic aspects as part of their tuning and assessment: collisions, reachability, joint limits, and robot singularities. Regarding collisions, the robot teaching system 10 may optionally include in its scan more than just the workpiece 15, such as including fixtures, tables, and other items in the robot workspace. The automatic collision assessment may include executing the taught path in simulation and modifying the path automatically or manually if and when the robot 14 or its tooling would collide with anything detected by the scan, for example the workpiece 15 or an item in the workspace. An example of a modification to the path would be, without limitation, changing the orientation of the tool, such as rotating the tool around its Rz or other axis. The attempted automatic reorientations may be limited by preset ranges determined by the user 17 and/or preset value. The automatic reachability assessment may include if there is any way to reach and move through all the points in the taught path, and modifying the path in order to achieve reachability when possible, for example without limitation, rotating the tool around its Rz axis or modifying other tool angles. The joint limit and singularity checks follow a similar procedure. One or more of these checks are combined as defined by the user 17 or are preselected, preconfigured, or default settings in the robot teaching system 10.

In an alternative embodiment, these automatic checks would be performed during the pose teaching operations of steps 606 through 614 shown in FIG. 6A, and it would be reported to the user 17 when cases arise that no modification to the taught pose can be found that will make the pose meet the selected criteria, for example without limitation, a pose that is both reachable and collision free. The results of the automatic checks performed during the teaching operation may be presented to the user 17 by, without limitation, a graphical interface or augmented reality interface showing the valid pose or path (or that none with found).

Figure 15B:
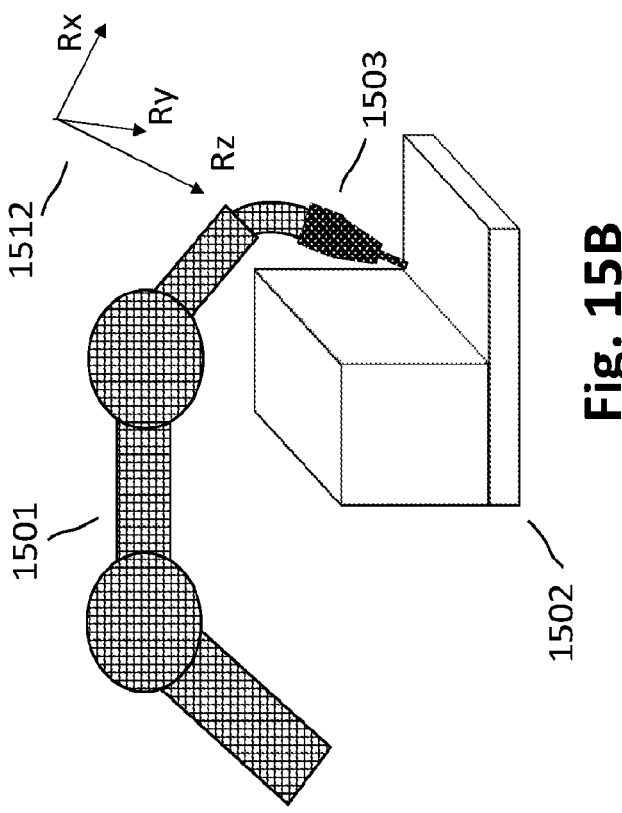
FIGS. 15A-15B show a robot performing work on a workpiece in two different orientations.
Figure 15A:
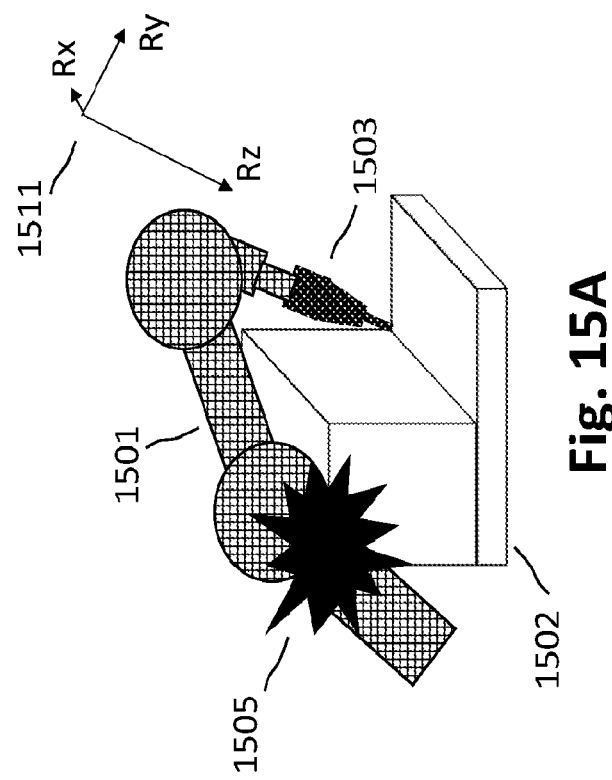

FIGS. 15A-15B show a robot 1501 in two possible orientations attempting to perform work on a workpiece 1502 with a tool 1503. In FIG. 15A, the orientation of the tool 1503 is composed of the vectors Rx, Ry, and Rz, as shown by coordinate system 1511 that has the same orientation as the tool 1503. The orientation of the tool 1503 in FIG. 15A results in a robot configuration such that the robot 1501 has an area of collision 1505 between the robot 1501 and the workpiece 1502. As described above, the robot teaching system 10 may use the scan of the workpiece 1502 to automatically assess the pose for, without limitation, collisions, reachability, joint limits and so on. Detecting the collision as indicated by 1505, the robot teaching system 10, as described above, may assess alternative orientations to avoid this and other collisions and other faults. In FIG. 15B, an alternative orientation for the same robot 1501 and tool 1503 from FIG. 15A is shown that was found by the robot teaching system 10 and which avoids the area of collision 1505 between the robot 1501 and the workpiece 1502. The robot teaching system 10 may have found this orientation by rotating the tool 1503 around its Rz as described above. The final orientation of the tool 1503 may be composed by the vectors Rx, Ry, and Rz, and has the same orientation as shown in the coordinate system 1512.

While several embodiments of the disclosure have been shown in the drawings, it is not intended that the disclosure be limited thereto, as it is intended that the disclosure be as broad in scope as the art will allow and that the specification be read likewise. Therefore, the above description should not be construed as limiting, but merely as exemplifications of particular embodiments.

What is claimed is:

1. A method for teaching a robot program, the method comprising:

obtaining geometric information about a workpiece via a 2D or 3D scanner scanning the workpiece;

obtaining at least one pose, of a posing device, for a robot comprising a jointed arm and an end effector;

obtaining, by user input, program information describing at least one of a motion for the robot and a behavior for the end effector of the robot, and associating the at least one of the motion and the behavior with the at least one pose;

determining at least one best fit geometry of at least a portion of the geometric information about the workpiece;

obtaining, by user input, a type of geometric relationship;

evaluating the type of geometric relationship between the at least one best fit geometry and the at least one pose and displaying a representation of the geometric relationship during the obtaining of the at least one pose; and displaying a closest corresponding point of the at least one pose on the best fit geometry;

determining an original set of instructions of the robot program based on the geometric information, the program information, and the at least one pose, wherein the original set of instructions comprises at least one of a pose for the robot, a motion for the robot, and a behavior for the end effector.

2. The method of claim 1 wherein the posing device comprises one of:

a process-agnostic pointing device;

a dummy end effector;

the end effector; and a hand of a user.

3. The method of claim 1 wherein the obtaining of the at least one pose or the geometric information is responsive to user input comprising at least one of:

effecting a robot lead-through; and jogging the robot.

4. The method of claim 1 wherein the displaying of the representation of the geometric relationship comprises at least one of:

displaying the representation on a screen of a computing device;

displaying the representation on an augmented- or virtual-reality (AR/VR) device; and projecting the representation onto the workpiece.

5. The method of claim 1 further comprising determining additional program information based on a user-selected profile.

6. The method of claim 1 wherein the at least one pose comprises at least two poses, and wherein the original set of instructions is based on the at least two poses or an orientation of the end effector described by the original set of instructions is based on the at least two poses.

7. The method of claim 1, further comprising:

obtaining prior geometric information about at least one prior workpiece operated on by a prior robot;

determining at least one geometric association between at least a portion of the prior geometric information and at least a portion of the geometric information;

obtaining prior assessment information describing at least one of:

an indication of whether a prior instruction previously executed by the prior robot succeeded or failed, and a quality of an outcome of the prior instruction previously executed by the prior robot;

recommending to a user at least one current set of instructions for execution by the robot for the workpiece, wherein the recommendation is generated by a machine-learning algorithm having received as input the geometric information, the program information, the at least one geometric association, and the prior assessment information, wherein the at least one current set of instructions comprises at least one of a pose for the robot, a motion for the robot, and a behavior for the end effector.

8. The method of claim 7 further comprising:

obtaining, by user input, an indication to select, deselect, modify, supplement, or delete the at least one current set of instructions; and applying the indication to select, deselect, modify, supplement, or delete the at least one current set of instructions as reinforcement-learning input to the machine-learning algorithm.

9. The method of claim 7 wherein the recommending of at least one current set of instructions further comprises:

determining a confidence level associated with the at least one current set of instructions indicating a likelihood that the at least one current set of instructions will be successfully executed by the robot for the workpiece.

10. The method of claim 1, further comprising:

obtaining, by user input, a process type defining one or more first geometry types;

wherein the original set of instructions is further based on the process type;

executing the original set of instructions by the robot to gather additional geometric information;

updating the geometric information based on the additional geometric information to create second geometric information;

determining a second set of instructions of the robot program based on the second geometric information, the program information, and the at least one pose, wherein the second set of instructions comprises at least one of a pose for the robot, a motion for the robot, and a behavior for the end effector.

11. The method of claim 1, further comprising:

obtaining a first preliminary scan, by scanning a workspace of the robot, without the workpiece present, by the scanner; and obtaining a second preliminary scan, by scanning the workpiece, by the scanner;

defining a scan volume containing the workpiece by comparing the first preliminary scan to the second preliminary scan to determine a location, a maximum height, a maximum width, and a maximum length of the workpiece.

12. A system for teaching a robot program, the system comprising:

a robot comprising a jointed arm and an end effector;

a posing device;

a 2D or 3D scanner;

a user interface; and a non-transitory computer-readable medium, comprising instructions for causing a computing environment to perform the method of claim 1.

\* \* \* \* \*